(12) United States Patent
Ishiguro

(10) Patent No.: US 7,099,520 B2
(45) Date of Patent: Aug. 29, 2006

(54) IMAGE PROCESSING APPARATUS, IMAGE PROCESSING METHOD, AND PROGRAM PRODUCT FOR IMAGE PROCESSING

(75) Inventor: Terukazu Ishiguro, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 979 days.

(21) Appl. No.: 10/187,950

(22) Filed: Jul. 3, 2002

(65) Prior Publication Data
US 2003/0007183 A1 Jan. 9, 2003

(30) Foreign Application Priority Data
Jul. 5, 2001 (JP) .............................. 2001-204714

(51) Int. Cl.
*G06K 9/40* (2006.01)
(52) U.S. Cl. ...................... 382/275; 382/260; 382/266
(58) Field of Classification Search ................ 382/260, 382/266, 270, 275, 63, 176; 358/522, 448; 347/252
See application file for complete search history.

(56) References Cited

U.S. PATENT DOCUMENTS

| | | | | |
|---|---|---|---|---|
| 4,905,023 A | * | 2/1990 | Suzuki | 347/252 |
| 5,109,436 A | * | 4/1992 | Machida et al. | 382/270 |
| 5,363,210 A | * | 11/1994 | Sasaki et al. | 358/448 |
| 6,072,889 A | * | 6/2000 | Deaett et al. | 382/103 |
| 6,078,410 A | * | 6/2000 | Adachi | 358/522 |

FOREIGN PATENT DOCUMENTS

| | | |
|---|---|---|
| JP | 2000-175032 | 6/2000 |
| JP | 2000-307869 | 11/2000 |

OTHER PUBLICATIONS

Byrom et al., "Densitometry Arterial Lesion Size Using Morphologically Filtered Images", IEEE, Sep. 1993, pp. 591-594.*

* cited by examiner

*Primary Examiner*—Anh Hong Do
(74) *Attorney, Agent, or Firm*—Buchanan Ingersoll & Rooney PC

(57) ABSTRACT

There is provided an image processing apparatus, image processing method, and a program product for image processing capable of reproducing character images against a background region clearly without white framed areas or turbid areas. An MTF corrector 21 includes a lightness-change controller 113. The lightness-change controller 113 is constituted by two AND circuits 114, 115 and a lightness-change filter 116. In the AND circuit 114, there are inputted a character-region against halftone solid-region signal (_BETA_MOJI) and an inversed signal of a character-region-discrimination inner edge signal (_INEDG). On the other hand, in the AND circuit 115, there are inputted a character-region against halftone-dot-region signal (_AMI_MOJI) and an inversed signal of a character-region-discrimination inner edge signal (_INEDG). Output signals from the AND circuits 114 and 115 are inputted to the lightness-change filter 116. In the lightness-change filter 116, lightness of a target pixel is changed from its inherent lightness to average lightness of a background region adjoining the target pixel.

15 Claims, 19 Drawing Sheets

FIG.5  MAIN-SCAN DIRECTIONAL PRIMARY DIFFERENTIAL FILTER

| 16 | 0  | 0 | 0   | -16 |
|----|----|---|-----|-----|
| 32 | 32 | 0 | -32 | -32 |
| 32 | 64 | 0 | -64 | -32 |
| 32 | 32 | 0 | -32 | -32 |
| 16 | 0  | 0 | 0   | -16 |

FIG.6  SUB-SCAN DIRECTIONAL PRIMARY DIFFERENTIAL FILTER

| 16  | 32  | 32  | 32  | 16  |
|-----|-----|-----|-----|-----|
| 0   | 32  | 64  | 32  | 0   |
| 0   | 0   | 0   | 0   | 0   |
| 0   | -32 | -64 | -32 | 0   |
| -16 | -32 | -32 | -32 | -16 |

FIG.7  + TYPE SECONDARY DIFFERENTIAL FILTER

| 0 | 0 | 1  | 0 | 0 |
|---|---|----|---|---|
| 0 | 0 | 0  | 0 | 0 |
| 1 | 0 | -4 | 0 | 1 |
| 0 | 0 | 0  | 0 | 0 |
| 0 | 0 | 1  | 0 | 0 |

FIG.8  X TYPE SECONDARY DIFFERENTIAL FILTER

| 1 | 0 | 0 | 0 | 1 |
|---|---|---|---|---|
| 0 | 0 | 0 | 0 | 0 |
| 0 | 0 | -4 | 0 | 0 |
| 0 | 0 | 0 | 0 | 0 |
| 1 | 0 | 0 | 0 | 1 |

FIG.9  OUTER/INNER EDGE DISCRIMINATING FILTER

| 1 | 0 | 1 | 0 | 1 |
|---|---|---|---|---|
| 0 | 0 | 0 | 0 | 0 |
| 1 | 0 | -8 | 0 | 1 |
| 0 | 0 | 0 | 0 | 0 |
| 1 | 0 | 1 | 0 | 1 |

FIG.16  −45 −DEGREE DIFFERENTINAL FILTER

|   |   |    |   |   |
|---|---|----|---|---|
| 1 | 0 | 0  | 0 | 0 |
| 0 | 0 | 0  | 0 | 0 |
| 0 | 0 | −2 | 0 | 0 |
| 0 | 0 | 0  | 0 | 0 |
| 0 | 0 | 0  | 0 | 1 |

FIG.17  0 −DEGREE DIFFERENTINAL FILTER

|   |   |    |   |   |
|---|---|----|---|---|
| 0 | 0 | 0  | 0 | 0 |
| 0 | 0 | 0  | 0 | 0 |
| 1 | 0 | −2 | 0 | 1 |
| 0 | 0 | 0  | 0 | 0 |
| 0 | 0 | 0  | 0 | 0 |

FIG.18  45 −DEGREE DIFFERENTINAL FILTER

|   |   |    |   |   |
|---|---|----|---|---|
| 0 | 0 | 0  | 0 | 1 |
| 0 | 0 | 0  | 0 | 0 |
| 0 | 0 | −2 | 0 | 0 |
| 0 | 0 | 0  | 0 | 0 |
| 1 | 0 | 0  | 0 | 0 |

FIG.19

90 - DEGREE DIFFERENTIAL FILTER

| 0 | 0 | 1 | 0 | 0 |
|---|---|---|---|---|
| 0 | 0 | 0 | 0 | 0 |
| 0 | 0 | -2 | 0 | 0 |
| 0 | 0 | 0 | 0 | 0 |
| 0 | 0 | 1 | 0 | 0 |

FIG.20

SMOOTHING FILTER

| 1 | 2 | 2 | 2 | 1 |
|---|---|---|---|---|
| 2 | 4 | 4 | 4 | 2 |
| 2 | 4 | 4 | 4 | 2 |
| 2 | 4 | 4 | 4 | 2 |
| 1 | 2 | 2 | 2 | 1 |

FIG.21

MINIMIZING FILTER

| $a11$ | $a12$ | $a13$ | $a14$ | $a15$ |
|---|---|---|---|---|
| $a21$ | $a22$ | $a23$ | $a24$ | $a25$ |
| $a31$ | $a32$ | $a33$ | $a34$ | $a35$ |
| $a41$ | $a42$ | $a43$ | $a44$ | $a45$ |
| $a51$ | $a52$ | $a53$ | $a54$ | $a55$ |

$a33 = \min(a11, a12, a13, a14, a15,$
$a21, a22, a23, a24, a25,$
$a31, a32, a33, a34, a35,$
$a41, a42, a43, a44, a45,$
$a51, a52, a53, a54, a55)$

IMAGE PROCESSING APPARATUS, IMAGE PROCESSING METHOD, AND PROGRAM PRODUCT FOR IMAGE PROCESSING

This application is based on Application No. 2001-204714 filed in Japan, contents of which is hereby incorporated by reference.

BACKGROUND OF THE INVENTION

1. Field of the Invention

The present invention relates to an image processing apparatus, image processing method, and a program product for image processing, especially, image data correction, thereby to reproduce character images or the like clearly. More particularly, the present invention relates to an image processing apparatus, image processing method, and a program product for image processing capable of clearly reproducing character images against a halftone-dot region or a halftone solid region with a certain extent of density (these regions will be mentioned as background region hereinafter) clearly without white framed areas or turbid areas around character images against a background region.

2. Description of Related Art

In digital copiers that conduct image processing by reading images with a CCD sensor and resolving image data into pixels, edge enhancement processing is executed so as to reproduce characters and fine lines clearly. In edge enhancement processing, density of an inside portion of an edge (inner edge, hereinafter) is set higher than that of an original image, whereas density of an outside portion of the edge (outer edge, herein after) is set lower than that of the original image. Edge regions become distinctive with such edge enhancement processing, whereby characters and fine lines of an original document are reproduced clearly.

However, there has been a problem such that in case edge enhancement processing is applied to a character or the like against a background region, a white frame is formed around reproduced character image as shown in FIG. 28. To resolve the problem such as above, there has been taken a countermeasure. An example of resolution is disclosed in JP Laid-open Patent Publication No. 2000-307869. The Publication discloses a manner such that in case edge enhancement processing is applied to a character image against a halftone dot region or the like, the edge enhancement processing with respect to an outer edge region is not executed so as to avoid formation of a white frame around the character image.

However, technique disclosed in the Publication No. 2000-307869 has several problems such that (1) degree of clearness regarding a character image formed on a halftone dot region deteriorates, and (2) colors of an original image are reproduced turbidly. The problems as such occur because edge enhancement processing is not applied to an outer edge region. That is, smoothing processing is applied to the outer edge region as well as a halftone dot region beneath the edge region. As a result, the character image on the halftone dot region gets blurred and reproduced colors get turbid. Therefore, there has not been feasible to reproduce an image with high quality. Incidentally, same problems occur in case a character image laid out on a halftone solid region with a predetermined density is to be reproduced.

SUMMARY OF THE INVENTION

The present invention has been made in order to solve the foregoing problems. It is an object of the present invention to provide an image processing apparatus, image processing method, and a program product for image processing capable of reproducing character images against a background region clearly without white framed areas or turbid areas.

According to one aspect of the present invention, there is provided an image processing apparatus comprising: outer edge discriminating means for discriminating whether or not a target pixel belongs to an outer edge region, an outer side of an edge region, based on image data; background region discriminating means for finding a background region by discriminating whether or not a target pixel belongs to a background region based on image data; first correcting means for applying first correction processing to a target pixel based on image data; second correcting means for applying second correction processing that differs from the first correction processing to a target pixel based on image data; and correction-processing-type determining means for determining which type of correction processing, namely, first correction processing or second correction processing, is to be applied to a target pixel discriminated as belonging to an outer edge region by the outer edge discriminating means; wherein the correction-processing-type determining means determines to apply the first correction processing to a target pixel discriminated as not belonging to a background region by the background region discriminating means, and wherein the correction-processing-type determining means determines to apply the second correction processing to a target pixel discriminated as belonging to a background region by the background region discriminating means. It should be noted that "background region" includes a halftone solid region with predetermined level of density and a halftone dot region.

In the inventive image processing apparatus, the outer edge discriminating means discriminates whether or not a target pixel belongs to an outer edge region, an outer side portion of an edge region based on image data. Furthermore, the background region discriminating means discriminates whether or not a target pixel belongs to a background region based on image data. Through background region discrimination, background regions are found. That is, a region where pixels discriminated as belonging to a background region distribute is found as a background region. It should be noted that discriminations of outer edge region and background region may be conducted in accordance with well-known discrimination methods. As to outer edge discriminating means, an outer edge region may be discriminated by finding an inner edge region.

Image data may be what is obtained by scanning an image, what is obtained from a recording medium in which image data is inputted, what is obtained from a network and the like. That is, there may be applicable of any image data obtained through any devices capable of obtaining image data, namely, a scanner, a data reading device, an input port, a modem, or the like.

Next, either the first correction processing by the first correcting means or the second correction processing by the second correcting means is applied to a target pixel discriminated as belonging to an outer edge region by the outer edge discriminating means. The correction-processing-type determining means determines which type of correction processing is to be applied to a target pixel. That is, in case the background region discriminating means has discriminated that a target pixel does not belong to a background region, the correction-processing-type determining means determines to apply the first correction processing to the target pixel, whereas in case the background region discriminating means has discriminated that a target pixel belongs to a background region, the correction-processing-type determining means determines to apply the second correction processing to the target pixel.

As the first correction processing by the first correcting means, there may be conducted edge weakening processing. Furthermore, as the second processing by the second correcting means, there may be conducted density-change processing to change density of a target pixel from its inherent density to density of pixels surrounding the target pixel. It should be noted that density of pixels surrounding a target pixel is typical density (average density, for example) of pixels in a predetermined region adjoining a target pixel. Typical density is set as so, whereby edge weakening processing is applied to a target pixel discriminated as belonging to an outer edge region but not to a background region, e.g., typical character images to be formed against a white background. Typical edge enhancement processing may be applied to an inner edge region. Accordingly, such manners of image processing make edge portions of characters more clearly, whereby character images can be reproduced sharply. Additionally, white frames are never formed around characters.

On the other hand, density-change processing is applied to a target pixel discriminated as belonging to an outer edge region as well as a background region, e.g., characters to be formed against a halftone solid or halftone-dot background. More specifically, the density-change processing is to change density of the target pixel from its inherent density to density of pixels surrounding the target pixel. Thereby, density of a pixel of outer edge region against a background region is equalized to average density of surroundings of the pixel. Thereby, white frames are never formed around characters and fine lines against a halftone solid or halftone-dot background. Furthermore, since smoothing processing is not applied to such a target pixel, sharpness of reproduced characters and fine lines against a halftone solid or halftone-dot background does not deteriorate and no turbid occurs.

Density-change processing preferably changes density of a target pixel from its inherent density to average density at a region that the background discriminating means has discriminated as background region. As a result, density of boundary between a character and a background, i.e., an outer edge region, becomes almost equal to density of the background. Thereby, occurrence of white frames around characters can be prevented for sure. It should be noted that "density" here includes density value, and values correlative to density, e.g., lightness.

As average density, an average density value of pixels discriminated as belonging to a background region with a predetermined matrix (5*5 size, for example) in which a target pixel is centered may be used. Accordingly, in case a character region is included in a predetermined matrix, the character region is eliminated in calculating average density in the matrix. Matrix size may be set depending on state of background against characters. For example, in case of halftone-dot background, matrix size may be set to a size large enough to disregard influence of isolate points in the halftone-dot region. Furthermore, in case density of a background region has diversity, matrix size shall not be set too large so as to avoid making density difference between density of an outer edge region changed and density of the background surrounding the outer edge region apparent.

According to another aspect of the present invention, there is provided an image processing apparatus comprising: outer edge discriminating means for discriminating whether or not a target pixel belongs to an outer edge region, an outer side portion of an edge region, based on image data; background region discriminating means for finding a background region by discriminating whether or not a target pixel belongs to a background region based on image data; and density-change means for changing density of a target pixel from its inherent density to a density value calculated based on density of pixels surrounding the target pixel in case the outer edge discriminating means discriminates that the target pixel belongs to an outer edge region and the background region discriminating means discriminates that the target pixel belongs to a background region.

Furthermore, an image processing method in accordance with the another aspect of the present invention comprises: an outer-edge-discrimination step to discriminate whether or not a target pixel belongs to an outer edge region, an outer side portion of an edge region, based on image data; a background-region-discrimination step to discriminate whether or not a target pixel belongs to a background region based on image data; and a density-change step to change density of a target pixel from its inherent density to a density value calculated based on density of pixels surrounding the target pixel in case the target pixel is discriminated as belonging to an outer edge region in the outer-edge-discrimination step and the target pixel is discriminated as belonging to a background region in the background-region-discrimination step.

Still further, an program product for image processing in accordance with the another aspect of the present invention comprises: a computer readable medium; and a computer program stored on the computer readable medium, the computer program comprising step of: an outer-edge-discrimination step to discriminate whether or not a target pixel belongs to an outer edge region, an outer side portion of an edge region, based on image data; a background-region-discrimination step to discriminate whether or not a target pixel belongs to a background region based on image data; and a density-change step to change density of a target pixel from its inherent density to a density value calculated based on density of pixels surrounding the target pixel in case the target pixel is discriminated as belonging to an outer edge region in the outer-edge-discrimination step and the target pixel is discriminated as belonging to a background region in the background-region-discrimination step.

The present invention thus provides an image processing apparatus, an image processing method, and a program product for image processing capable of reproducing character images against a background region clearly without white framed areas or turbid areas.

BRIEF DESCRIPTION OF DRAWINGS

For a better understanding of the present invention, reference is made to the following detailed description of the invention, just in conjunction with the accompanying drawings in which:

FIG. 5 shows a primary differentiation filter (main scan direction);

FIG. 6 shows a secondary differentiation filter (sub-scan direction);

FIG. 7 shows a secondary filter (+ type);

FIG. 8 shows a secondary filter (× type);

FIG. 9 shows an outer/inner edge discrimination filter;

FIG. 16 shows a −45-degree differentiating filter;

FIG. 17 shows a 0-degree differentiating filter;

FIG. 18 shows a 45-degree differentiating filter;

FIG. 19 shows a 90-degree differentiating filter;

FIG. 20 shows a smoothing filter;

FIG. 21 shows a minimizing filter;

DETAILED DESCRIPTION OF PREFERRED EMBODIMENTS

Figure 1:
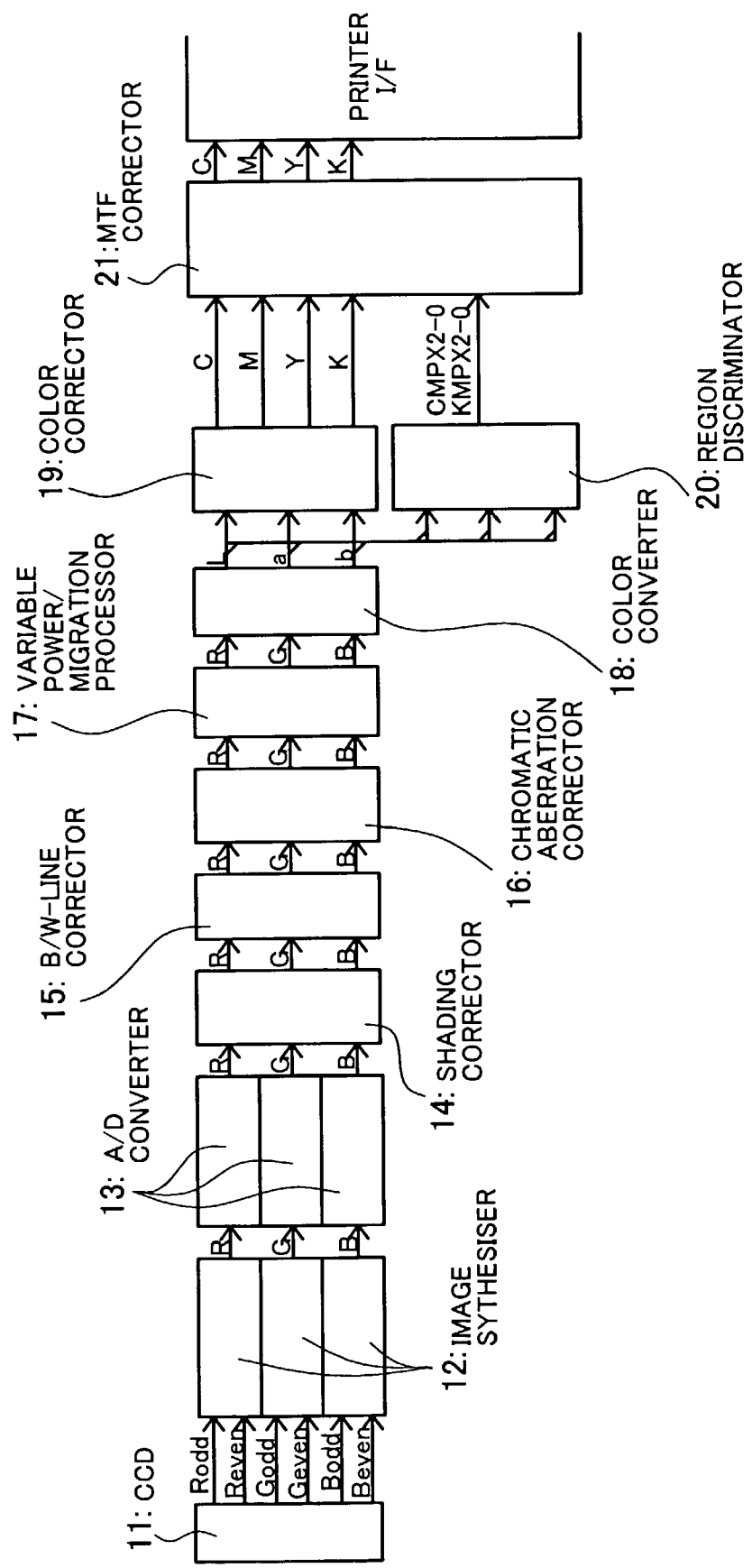
FIG. 1 is a block chart showing schematic structure of a full-color image processing apparatus directed to an embodiment.

Hereinafter, the best mode embodying an image processing apparatus according to the present invention will be described in detail with reference to the accompanying drawings. FIG. 1 shows a schematic diagram of a full-color image processing apparatus directed to this embodiment. The full-color image processing apparatus as such can be applicable to digital copiers, printers, facsimile or the like.

A color image processing apparatus of the present embodiment includes: a CCD sensor 11; image synthesizers 12; A/D converters 13; a shading corrector 14; a between-line corrector 15 for correcting spaces between lines; a chromatic aberration corrector 16 for correcting chromatic aberration of each color; a variable power/migration processor 17; a color converter 18; a color corrector 19; a region discriminator 20; an MTF corrector 21; and printer I/F.

The CCD sensor 11 receives reflected light obtained when a scanner scans over a document and opto-electrically converts the reflected light into analog RGB signals. The image synthesizers 12 synthesize an odd-numbered component and an even-numbered component with respect to each of the analog RGB signals obtained by the CCD sensor 11. The A/D converters 13 convert the analog RGB signals synthesized at the image synthesizers 12 into digital signals. It should be noted that those image synthesizers 12 and A/D converters 13 are provided for respective colors of RGB signals, i.e., for R signal, G signal, and B signal.

The shading corrector 14 is to get rid of unevenness of light quantity with respect to an image of main scanning direction. More specifically, before a document is scanned, the CCD sensor 11 receives reflected light from a white plate for shading correction and obtain analog data of the reflected light. Then, the analog data are converted into digital data and the digital data are stored in a memory. After a document is scanned, scanned document data are corrected based on digital data stored in the memory as reference value.

The variable power/migration processor 17 controls to write/readout data in the memory, whereby image scaling and image migration are processed. The color converter 18 converts color information of image data into data corresponding to one in the standardized color system. Here, Lab data are made up based on RGB signals. Lab data made up by the color converter 18 are inputted to the color corrector 19 and the region discriminator 20. Based on the Lab data, the color corrector 19 makes up recording-density signals CMYK which can be recorded in desired colors under conditions of spectral characteristics of four colors of toner to be practically used and actual recoding process.

Figure 2:
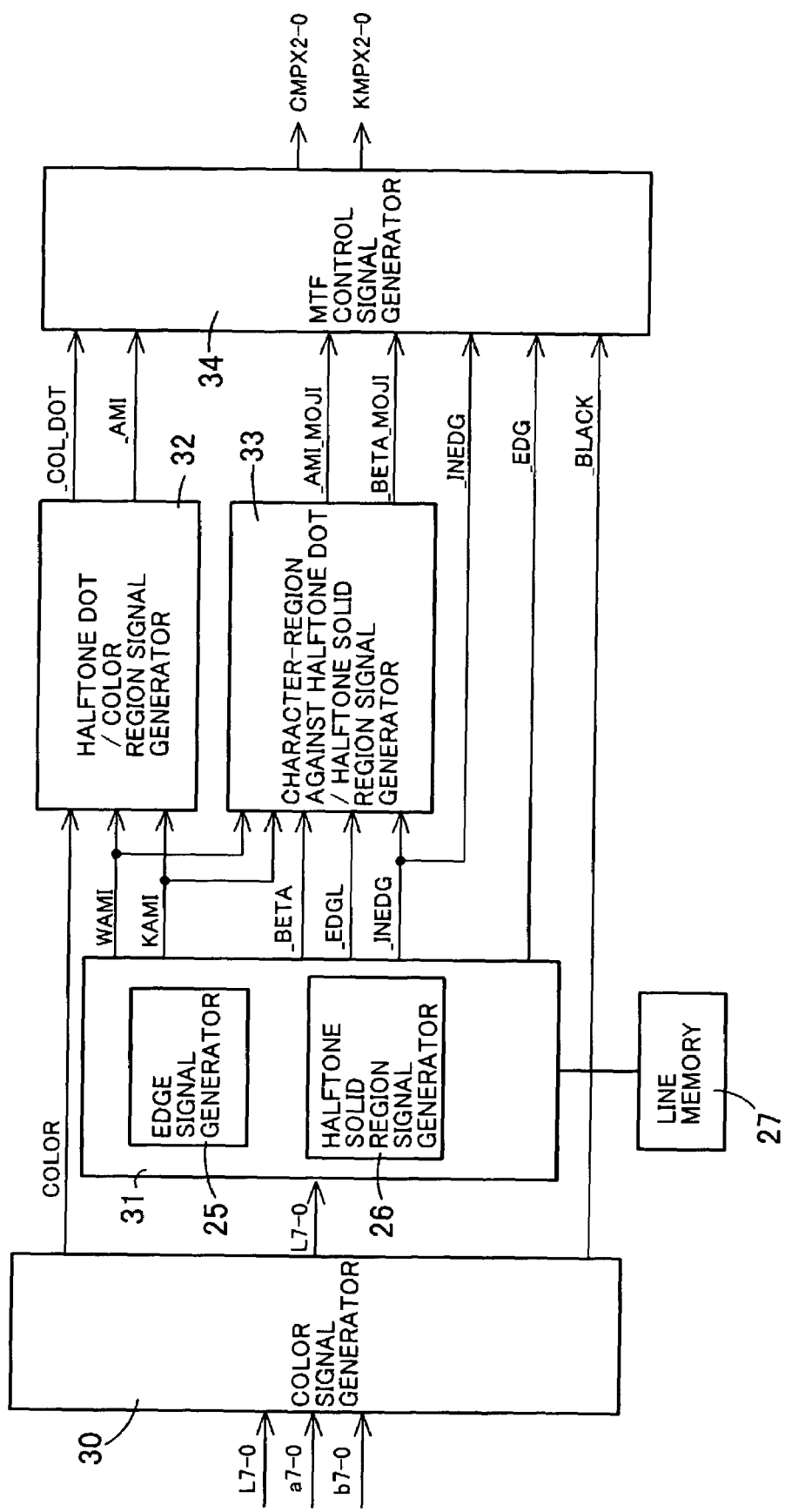
FIG. 2 is a block chart showing schematic structure of a region discrimination section of FIG. 1.

The region discriminator 20 discriminates image attribute with respect to each pixel. After generating signals corresponding to respective attribute, the region discriminator 20 generates control signals (CMPX, KMPX) to be transmitted to the MTF corrector 21 based on the attribute signals. The region discriminator 20 includes: a color signal generator 30; a various signal generator 31; a halftone dot/color region signal generator 32; a character-region against halftone dot/halftone solid region signal generator 33; and a MTF control signal generator 34, as shown in FIG. 2. The various signal generator 31 is constituted by an edge signal generator 25 and a halftone solid region signal generator 26 and connected to a line memory 27.

Figure 3:
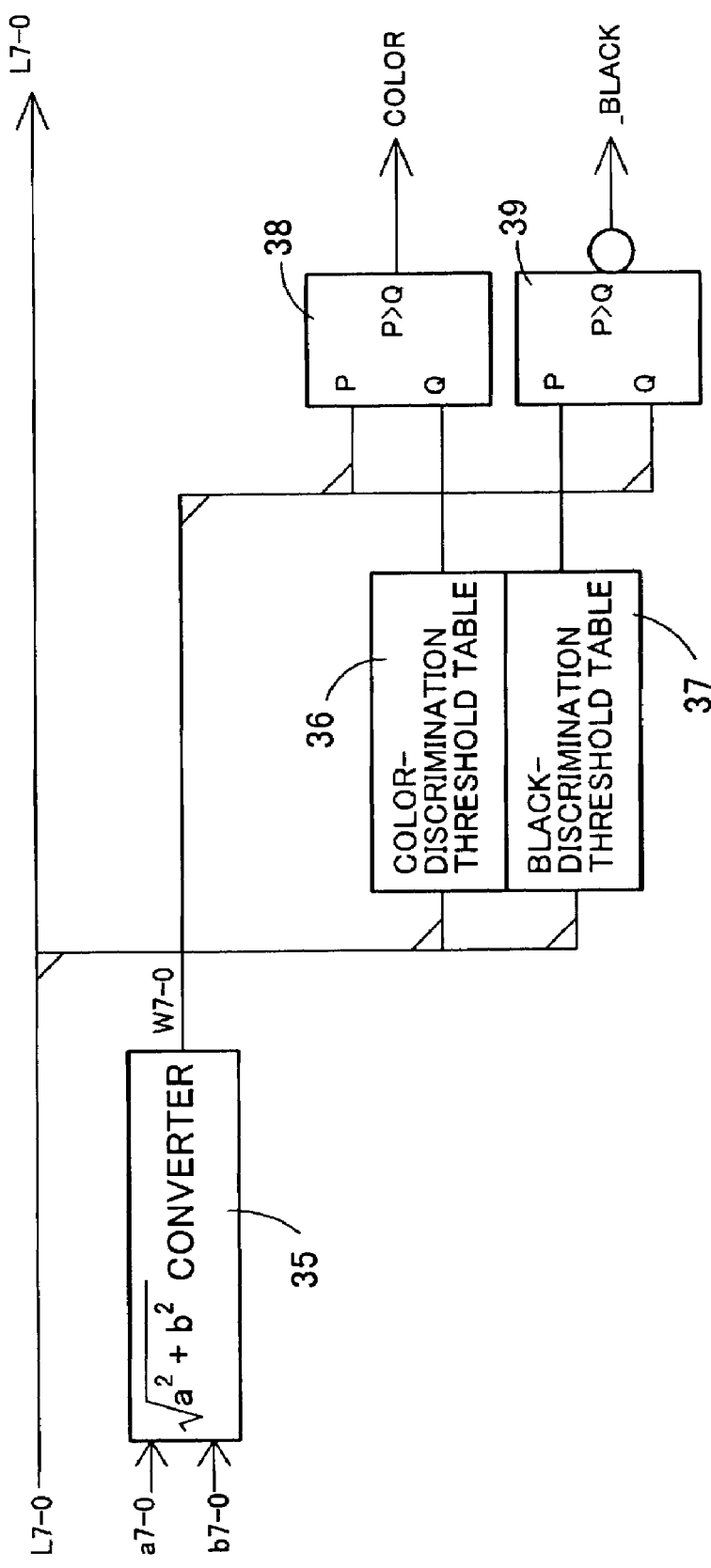
FIG. 3 is a block diagram showing schematic structure of a color signal generator of FIG. 2.

It should be noted that the color signal generator 30 generates color signals (COLOR) and black region signals (_BLACK) based on Lab data generated by the color converter 18. The color signal generator 30 is constituted by a converter 35, a black-discrimination threshold table 37, a color-discrimination threshold table 36, and two comparators 38, 39, as shown in FIG. 3.

The converter 35 generates chroma saturation data (W7-0) from data (a7-0, b7-0) by using a transformation ($\sqrt{(a^2+b^2)}$). The color-discrimination threshold table 36 makes up a threshold for generating color signals (COLOR) based on lightness data (L7-0). Furthermore, the black-discrimination threshold table 37 makes up a threshold for generating black region signal (_BLACK) based on lightness data (L7-0). As chroma saturation quantity depends on lightness non-linearly, thresholds for generating color signals (COLOR) and black region signals (_BLACK) are made up based on lightness data (L7-0).

With such structure of the color signal generator 30, the comparator 38 compares chroma saturation data (W7-0) with a threshold made up based on the color-discrimination threshold table 36, thereby to generate color signals (COLOR). Furthermore, the comparator 39 compares chroma saturation data (W7-0) with a threshold made up based on the black-discrimination threshold table 37, thereby to generate monochrome region signal (_BLACK).

Let us return to FIG. 2. The various signal generator 31 generates halftone-dot-discrimination isolate point signals (WAMI, KAMI), halftone solid region signals (_BETA), character-region-discrimination edge signals (_EDGL), character-region-discrimination inner edge signals (_INEDG), and character edge region signals (_EDG) based on lightness data (L7-0). For generating these various signals, the various-signal generator 31 includes an edge signal generator 25 and a halftone solid region signal generator 26.

The edge signal generator 25 generates halftone-dot-discrimination isolate point signals (WAMI, KAMI), character-region-discrimination edge signals (_EDGL), and character edge region signals (_EDG). Therefore, the edge signal generator 25 includes a 5*5 matrix generator 41, a characteristic-quantity extracting filter section 42, two selectors 43, 44, four comparators 45 through 48, an outer/inner edge discriminator 49, and two OR circuits 50, 51.

The 5*5 matrix generator 41 generates 5×5 sized matrix data from input image data. Then, at the characteristic-quantity extracting filter section 42, filter processing is applied to matrix data generated by the 5*5 matrix generator 41. The characteristic-quantity extracting filter section 42 is constituted by primary differential filters 52, 53 (for main and sub scanning directions), secondary differential filters 54, 55 (+ type and × type), an outer/inner edge discriminating filter 56, and an isolate point detecting filter 57. In this embodiment, what is shown in FIG. 5 is used as main-scan directional primary differential filter 52. What are shown in FIG. 6, FIG. 7, FIG. 8, and FIG. 9 are used as sub-scan directional primary differential filter 53, + type secondary differential filter 54, × type secondary differential filter 55, and outer/inner edge discriminating filter 56, respectively.

Figure 10:
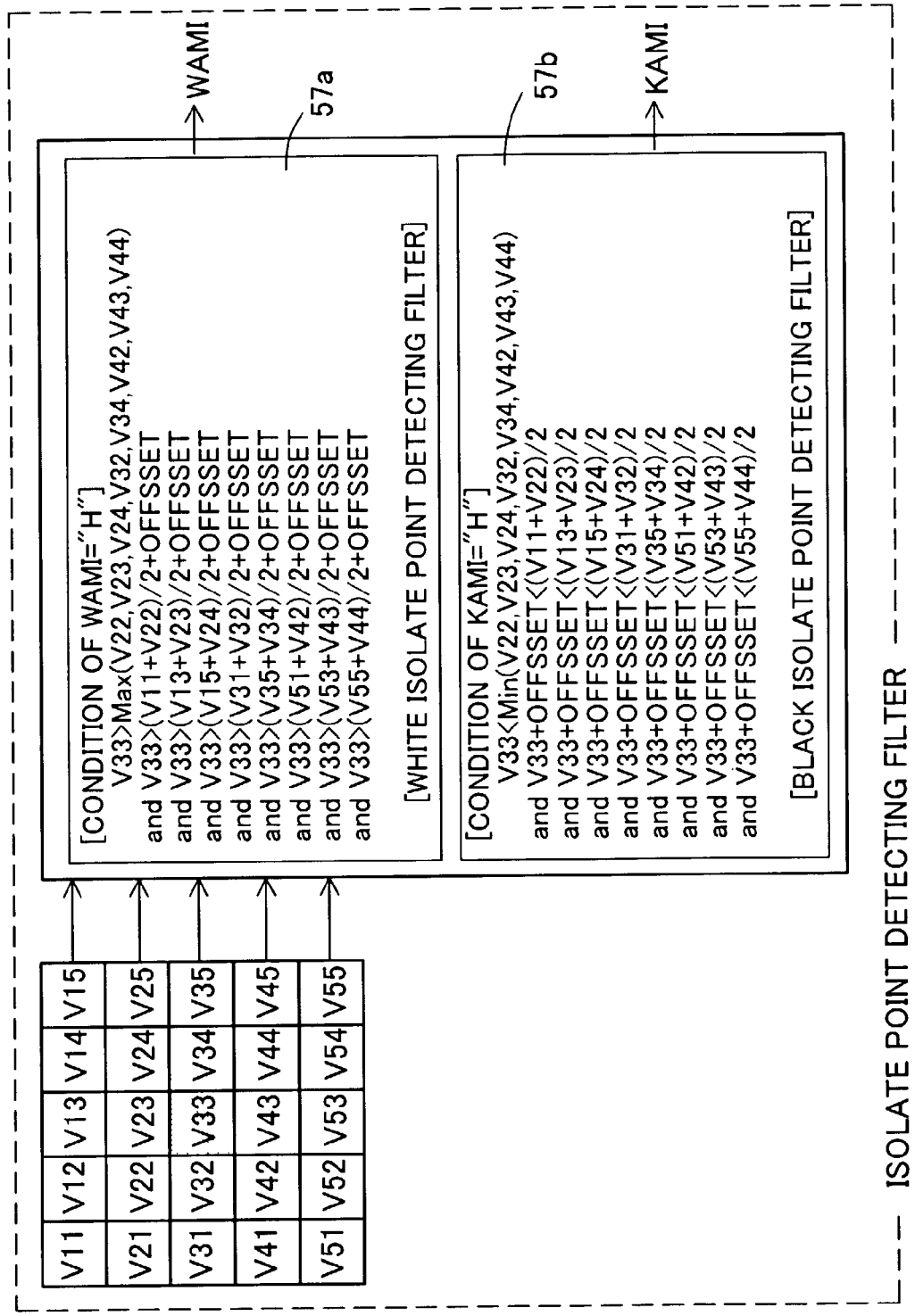
FIG. 10 shows an isolated-point detecting filter.

Furthermore, as isolate point detecting filter 57, what is shown in FIG. 10 is used. The isolate point detecting filter 57 is constituted by a white-isolate-point detecting filter 57a and a black-isolate-point detecting filter 57b. In case the white-isolate-point detecting filter 57b detects that a lightness value of a target pixel V33 is larger than those of adjoining eight pixels and larger than average lightness values of eight direction sets of two pixels with respect to the target pixel V33, a halftone-dot-discrimination isolate point signal (WAMI) is set "H" active.

That is, in case a lightness value of the target pixel V33 satisfies all conditions as below, the target pixel V33 is discriminated as white isolate point (WAMI="H") The followings are the conditions to be satisfied.

V33>MAX(V22, V23, V24, V32, V34, V42, V43, V44)
and V33>(V11+V22)/2+OFFSET,
and V33>(V13+V23)/2+OFFSET,
and V33>(V15+V24)/2+OFFSET,
and V33>(V31+V32)/2+OFFSET,
and V33>(V35+V34)/2+OFFSET,
and V33>(V51+V42)/2+OFFSET,
and V33>(V53+V43)/2+OFFSET,
and V33>(V55+V44)/2+OFFSET.

In case the black-isolate-point detecting filter 57b detects that a lightness value of the target pixel V33 is smaller than those of adjoining eight pixels and smaller than average lightness values of eight direction sets of two pixels with respect to the target pixel V33, a halftone-dot-discrimination isolate point signal (KAMI) is set "H" active.

That is, in case a lightness value of the target pixel V33 satisfies all conditions as below, the target pixel V33 is discriminated as black isolate point (KAMI="H") The followings are the conditions to be satisfied.

V33<MIN(V22, V23, V24, V32, V34, V42, V43, V44)
and V33+OFFSET<(V11+V22)/2,
and V33+OFFSET<(V13+V23)/2,
and V33+OFFSET<(V15+V24)/2,
and V33+OFFSET<(V31+V32)/2,
and V33+OFFSET<(V35+V34)/2,
and V33+OFFSET<(V51+V42)/2,
and V33+OFFSET<(V53+V43)/2,
and V33+OFFSET<(V55+V44)/2.

It should be noted that OFFSET is a threshold value for isolate point discrimination.

Figure 4:
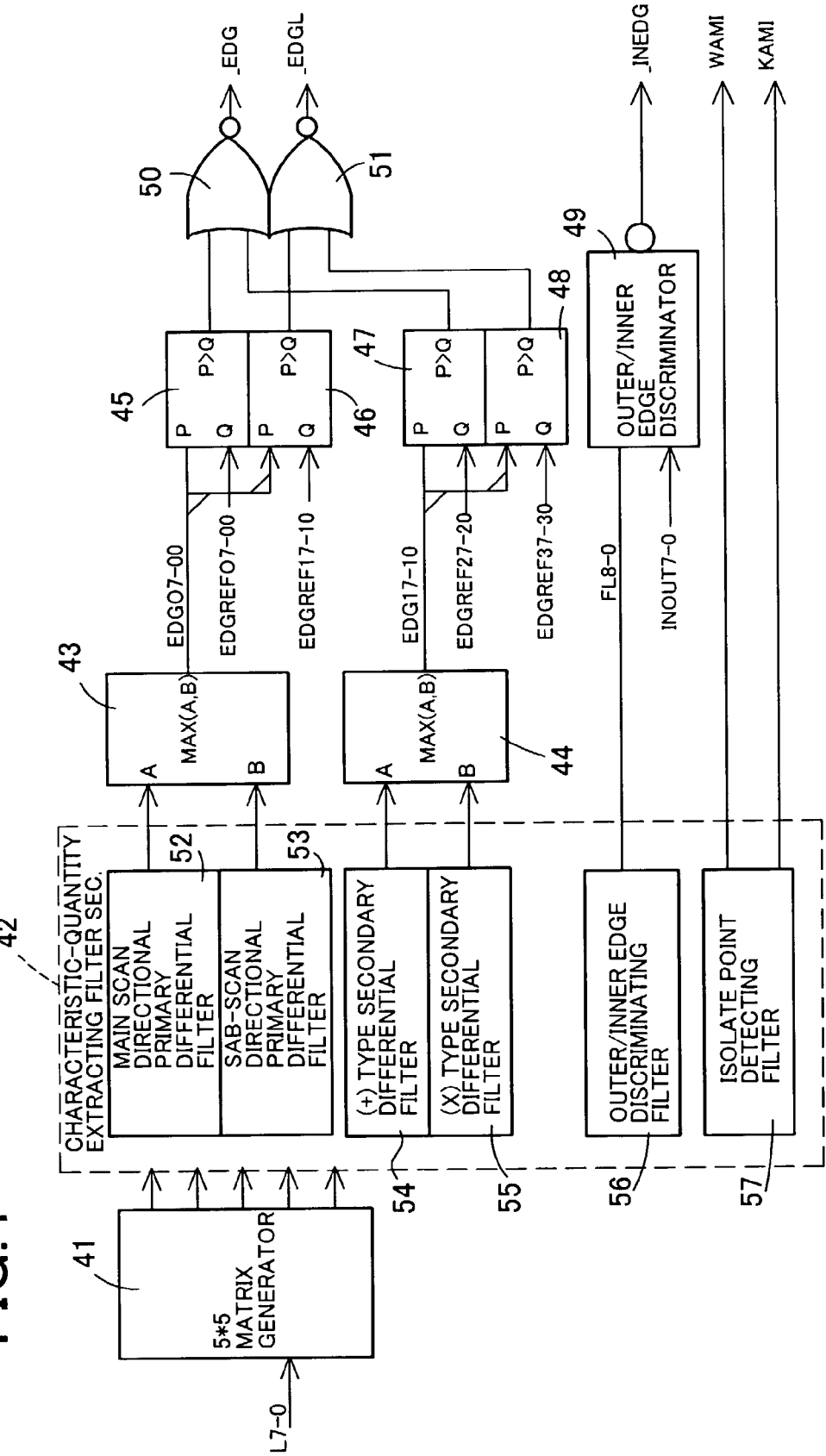
FIG. 4 is a block diagram showing schematic structure of an edge signal generator of FIG. 2.

Let us return to FIG. 4. Terminals A and B of the selector 43 receive an output from the main-scan directional primary differential filter 52 and an output from the sub-scan directional primary differential filter 53, respectively. Furthermore, Terminals A and B of the selector 44 receive an output from the + type secondary differential filter 54 and an output from × type secondary differential filter 55. Each of the selectors 43 and 44 selectively outputs a larger input value of the two input values of A and B.

Furthermore, an output (EDG7-00) from the selector 43 is inputted to a terminal P of the comparator 45. An edge reference value (EDGREF07-00) is inputted to a terminal Q of the comparator 45. Similarly, an output (EDG7-00) from the selector 43 is inputted to a terminal P of the comparator 46 and an edge reference value (EDGREF17-10) is inputted to a terminal Q of the comparator 46. On the other hand, an output (EDG17-10) from the selector 44 is inputted to a terminal P of the comparator 47 and an edge reference value (EDGREF27-20) is inputted to a terminal Q of the comparator 47. Similarly, an output (EDG17-10) from the selector 44 is inputted to a terminal P of the comparator 48 and an edge reference value (EDGREF37-30) is inputted to a terminal Q of the comparator 48.

An output from the comparator 45 and that of the comparator 47 are inputted to an OR circuit 50. Furthermore, an output from the comparator 46 and that of the comparator 48 are inputted to an OR circuit 51. With such structured OR circuit 50, a character edge region signal (_EDG) is set "L" active when either one of the conditions (1) or (2) as below is satisfied. The conditions are:

(1) A maximum value, out of resultant values obtained through filtering processing by the main-scan directional primary filter 52 and the sub-scan directional primary filter 53, is larger than an edge reference value (EDGREF07-00); and (2) A maximum value, out of resultant values obtained through filtering processing by the + type secondary differential filter 54 and the × type secondary differential filter 55, is larger than an edge reference value (EDGREF27-20).

Similar to the OR circuit 50, with respect to the OR circuit 51, a character edge region signal (_EDG) is set "L" active when either one of the conditions (3) or (4) as below is satisfied. The conditions are:

(3) A maximum value, out of resultant values obtained through filtering processing by the main-scan directional primary filter 52 and the sub-scan directional primary filter 53, is larger than an edge reference value (EDGREF17-10); and (4) A maximum value, out of resultant values obtained through filtering processing by the + type secondary differential filter 54 and the × type secondary differential filter 55, is larger than an edge reference value (EDGREF37-30).

Figure 11:
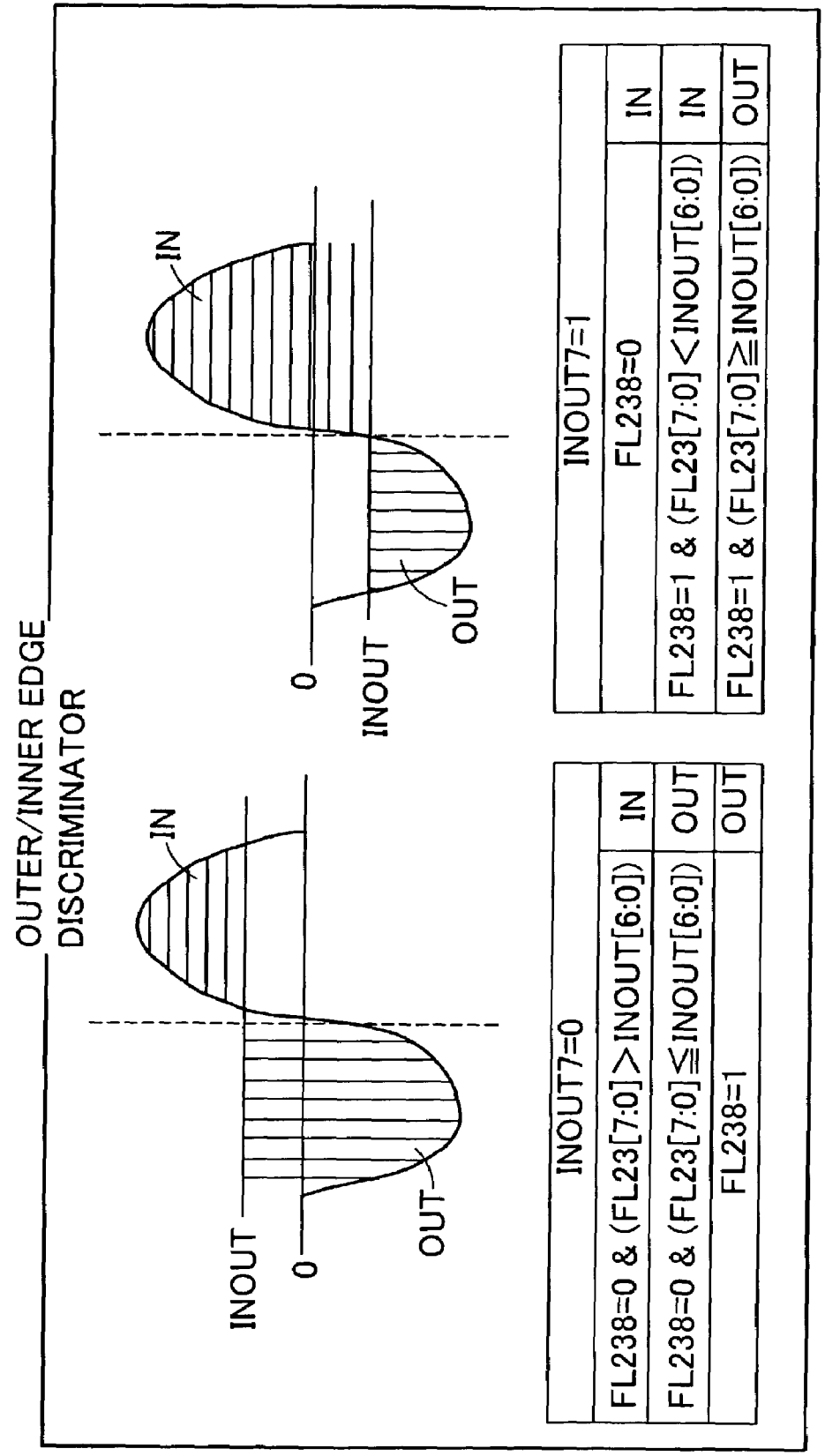
FIG. 11 is a diagram for illustrating a discrimination method by the outer/inner edge discrimination section of FIG. 4.

To the outer/inner edge discriminator 49, there are inputted a resultant value obtained through filtering processing by the outer/inner edge discriminating filter 56 and a discrimination reference value (INOUT7-0). The outer/inner edge discriminator 49 makes outer/inner-edge discriminations as shown in FIG. 11. That is, in case of INOUT7=0, an inner-edge discrimination is made when an edge detection quantity is a positive value (FL238=0) and larger than a threshold (INOUT6-0), whereas an outer-edge discrimination is made when an edge detection quantity is a positive value (FL238=0) and is smaller than the threshold (IN- OUT6-0). Furthermore, even when an edge detection quantity is a negative value, an outer-edge discrimination is made.

On the other hand, in case of INOUT7=1, an inner-edge discrimination is made when an edge detection quantity is a positive value (FL238=0). An inner-edge discrimination is also made when an edge detection quantity is a negative value (FL238=1) and smaller than the threshold (INOUT 6-0). Furthermore, an outer-edge discrimination is made when an edge detection quantity is a negative value (FL238=1) and larger than the threshold (INOUT 6-0). When a discrimination object is discriminated as inner edge, the outer/inner-edge discriminator 49 sets a character-region-detection dedicated inner edge signal (_INEDG) in "L active". It should be noted that the threshold (INOUT6-0) and a edge detection quantity (FL237-230) are absolute values.

Figure 12:
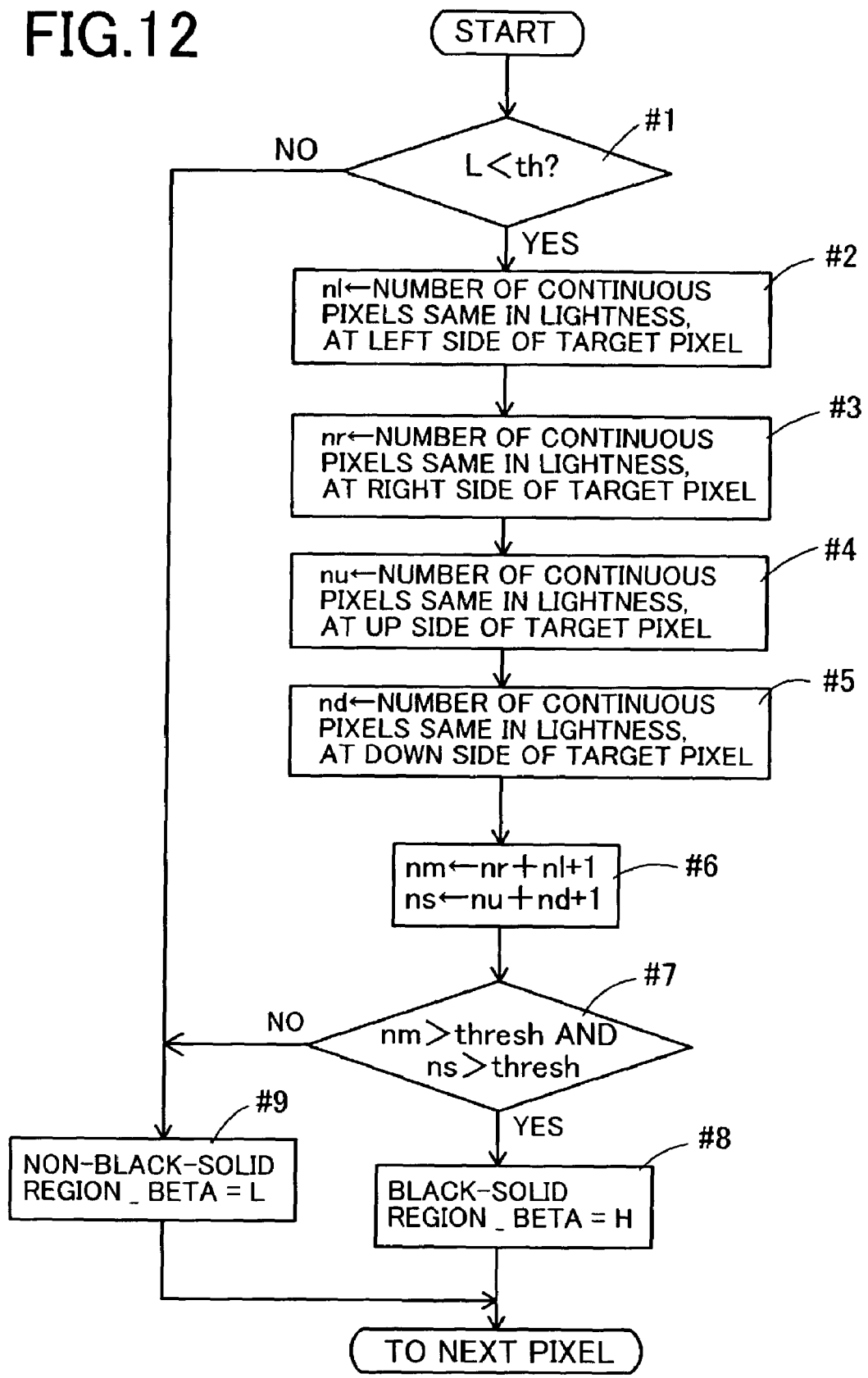
FIG. 12 is a flow chart showing processing contents at halftone solid region signal generator of FIG. 2.

Let us return to FIG. 2. The halftone solid region signal generator 26 generates a halftone solid region signal (_BETA). In other words, the halftone solid region signal generator 26 is arranged to detect a halftone solid region having a predetermined density. To be specific, a halftone solid region signal (_BETA) is generated in accordance with a flowchart shown in FIG. 12. That is, firstly, it is discriminated that whether lightness (L) of a target pixel is same as or lower than predetermined lightness (th) or not (#1). In case lightness of the target pixel (L) is same as or lower than the predetermined lightness (th), in other words, in case density of the target pixel is higher than predetermined density (#1: YES), the number of continuous pixels same in lightness, located at left side of the target pixel, namely, nl, is counted at first. A counted value is temporarily recorded in the line memory 27 (#2). It should be noted that "pixels same in lightness" may includes a pixel lightness of which is as high as a target pixel as well as a pixel lightness of which is within a predetermined value range, within±several gradations against lightness of the target pixel.

Next, the number of continuous pixels same in lightness, located at right side of the target pixel, namely, nr, that of continuous pixels same in lightness, located at up side of the target pixel, namely, nu, that of continuous pixels same in lightness, located at down side of the target pixel, namely, nd are temporarily stored in the line memory subsequently (#3, #4, #5). Thereby, the number of main-scan directional continuous pixels same in lightness, namely, nm and that of sub-scan directional continuous pixels same in lightness, namely, ns are calculated in accordance with the expressions as below and respective calculation results are temporarily stored in the line memory 27 (#6).

$$nm=nr+nl+1$$

$$ns=nu+nd+1$$

Next, it is discriminated that whether both the numbers of continuous pixels same in lightness nm and ns are larger than a threshold (thresh) or not. It should be noted that a threshold (thresh) may be set to a value large enough to avoid discriminating an area of an ordinary sized character image as halftone solid region lightness of which is same as the character image, depending on recording pixel density. In case both nm and ns are larger than the threshold (thresh) (#7: YES), the target pixel is discriminated as belonging to a halftone solid region lightness of which is same as that of the continuous pixels. As a result, a halftone solid region signal (_BETA) is set active (#8). On the other hand, in case at least either one of the numbers nm or ns is same as or smaller than the threshold (thresh), (#7: NO), the target pixel is discriminated as not-belonging to a halftone solid region lightness of which is same as that of the continuous pixels. Accordingly, a halftone solid region signal (_BETA) is not set active (#9). Furthermore, in case lightness of the target pixel is larger than predetermined lightness in #1 (#1: NO), the target pixel is also discriminated as not-belonging to a halftone solid region lightness of which is same as that of the continuous pixels (#9). After that, the afore-mentioned region discrimination processing is conducted for each pixel sequentially to find a halftone solid region constituted by pixels same in lightness.

Figure 13:
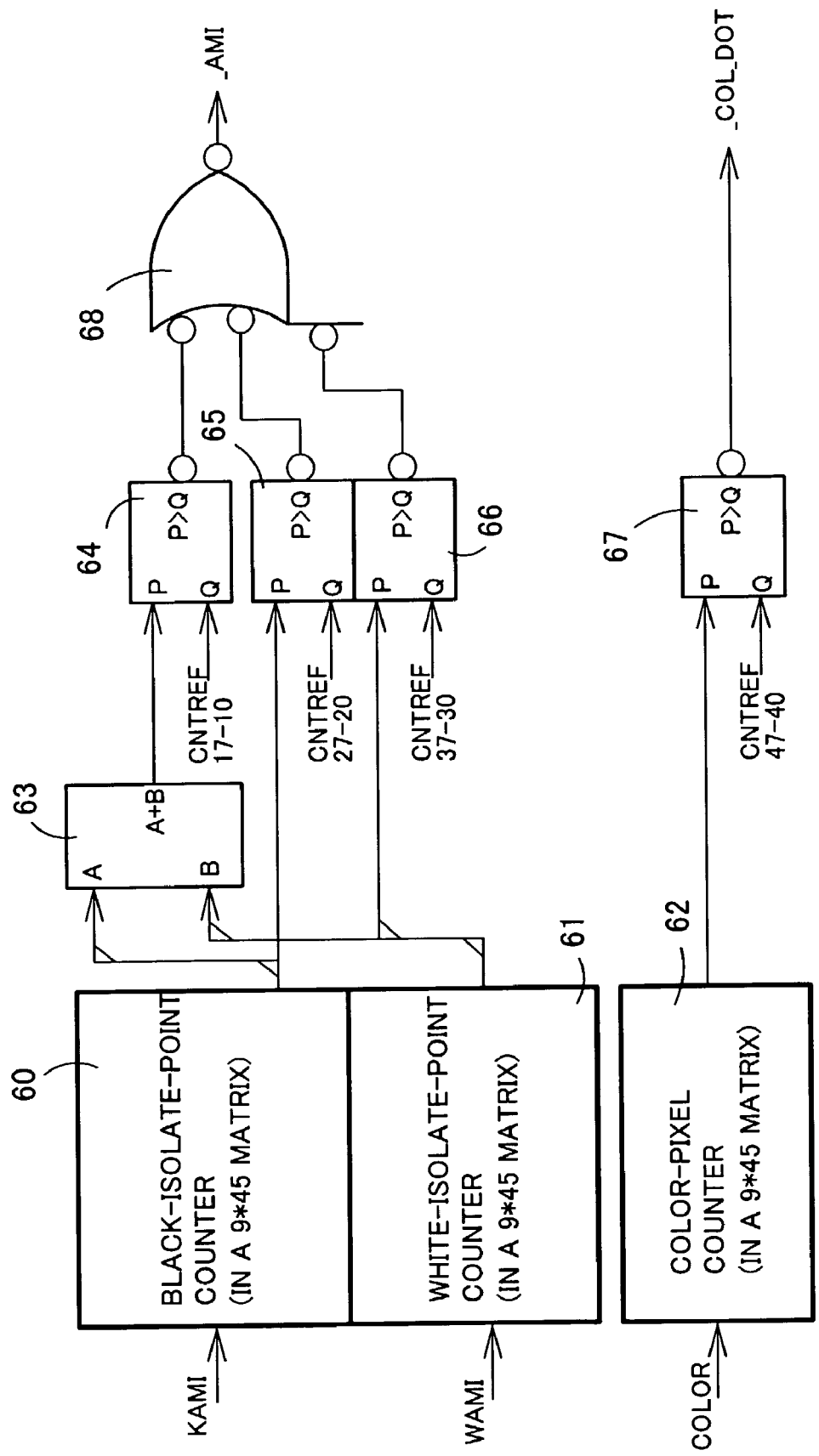
FIG. 13 is a block diagram showing schematic structure of a halftone dot/color region signal generator of FIG. 2.

Let us return to FIG. 2 again. The halftone-dot/color region signal generator 32 generates a color region signal (_COL_DOT) and halftone-dot region signal (_AMI) based on a color signal (COLOR) and a halftone-dot-discrimination isolate point signal (WAKI, WAMI). That is, the halftone-dot/color region signal generator 32 discriminates a halftone-dot region and a color region. Then, in case the halftone-dot/color region signal generator 32 sets both a color region signal (_COL_DOT) and halftone-dot region signal (_AMI) active for a pixel, the region discriminator 20 discriminates the pixels as belonging to a color-halftone-dot region. As shown in FIG. 13, the halftone-dot/color region signal generator 32 includes a black-isolate-point counter 60, a white-isolate-point counter 61, a color-pixel counter 62, an adder 63, comparators 64 through 67 and an OR circuit 68.

The black-isolate-point counter 60 counts the number of black isolate points in a 9*45 matrix region. Similarly, the white-isolate-point counter 61 counts the number of white isolate points in a 9*45 matrix region. An output from the black-isolate-point counter 60 is inputted to both a terminal A of the adder 63 and a terminal P of the comparator 65. On the other hand, An output from the white-isolate point counter 61 is inputted to both a terminal B of the adder 63 and a terminal P of the comparator 64. Furthermore, an output from the adder 63 is inputted to a terminal P of the comparator 64. It should be noted that reference values (CNTREF17-10, 27-20, 37-30) have been inputted to terminals Q of the comparators 64, 65, and 66, respectively. Outputs from the respective comparators 64 through 66 are inputted to the OR circuit 68.

In case at least one of the following three conditions is satisfied in the OR circuit 68, a target pixel is discriminated as belonging to a halftone-dot region, whereby a halftone dot region signal (_AMI) is set "L(active)". The three conditions are:

(1) Total number of black isolate points and white isolate points is larger than the reference value (CENTREF 17-10);
(2) The number of black isolate points is larger than the reference value (CNTREF27-20); and
(3) The number of white isolate points is larger than the reference value (CNTREF37-30).

Furthermore, the color-pixel counter 62 counts the number of color pixels in a 9*45 matrix region. An output from the color-pixel counter 62 is inputted to a terminal P of the comparator 67. The reference value (CENTREF47-40) has been inputted to a terminal Q of the comparator 67. In case the number of color pixels is larger that the reference value (CENTREF47-40) in the comparator 67, a target pixel is discriminated as color pixel, whereby a color region signal (_COL_DOT) is set "L (active)".

The halftone-dot/color region signal generator 32 thus generates a halftone-dot region signal (_AMI) and a color region signal (_COL_DOT). Thereby, the region discriminator 20 can discriminate a color-halftone-dot region.

Figure 14:
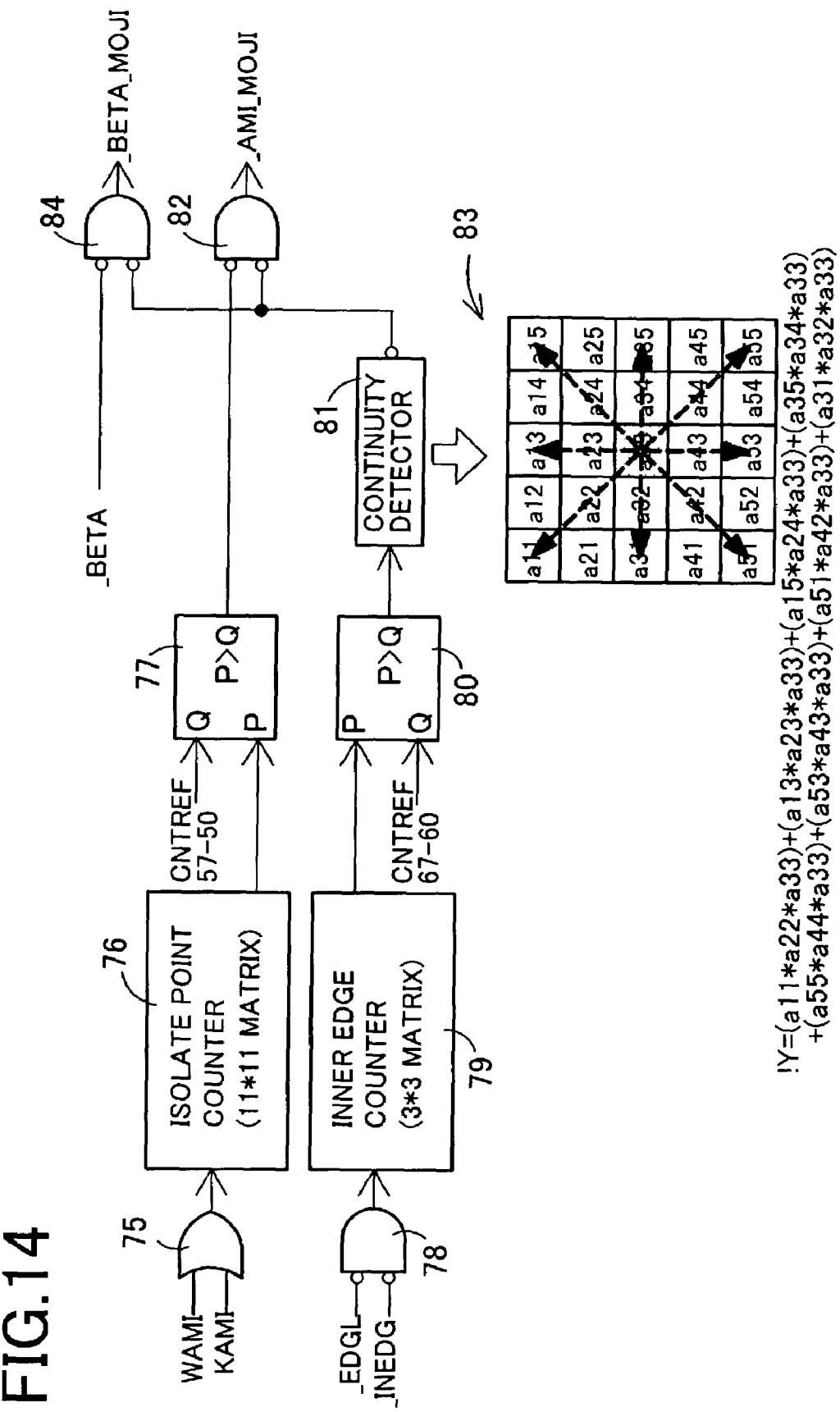
FIG. 14 is a block diagram showing schematic structure of a halftone dot/halftone solid region signal generator of FIG. 2.

Let us return to FIG. 2. The character-region against halftone-dot/halftone solid region signal generator 33 generates a character-region against halftone-dot-region signal (_AMI_MOJI) and a character-region against halftone solid-region signal (_BETA_MOJI) based on halftone-dot-discrimination isolate point signals (WAMI, KAMI), a halftone solid region signal (_BETA), a character-region-discrimination edge signal (_EDGL), and a character-region-discrimination inner edge signal (_INEDG). That is, the character-region against halftone-dot/halftone solid region signal generator 33 finds a character region against a halftone-dot region or a halftone solid region. As shown in FIG. 14, character-region against halftone-dot/halftone solid region signal generator 33 includes an OR circuit 75, three AND circuit 78, 82, 84, an isolate-point counter 76, an inner-edge counter 79, two comparators 77, 78, and a continuity detector 81.

The isolate point counter 76 counts up the number of isolation points in a 11*11 matrix region. The inner-edge counter 79 counts up the number of inner edges in a 3*3 matrix region. The continuity detector 81 detects continuity of inner edges, i.e., whether or not inner edges exist continuously.

Halftone-dot-discrimination isolate point signals (WAMI, KAMI) are inputted in the OR circuit 75. Accordingly, the OR circuit 75 outputs a logical add of "WAMI" and "KAMI". An output from the OR circuit 75 is inputted to the isolate-point counter 76. Further on, an output from the isolate-point counter 76 is inputted to the terminal P of the comparator 77. On the other hand, the reference value (CENTREF57-50) has been inputted to the terminal Q of the comparator 80.

A character-region-discrimination edge signal (_EDGL) and a character-region-discrimination inner edge signal (_INEDG) are inputted in the AND circuit 78. Accordingly, the AND circuit 78 outputs a logical product of "_WDGL" and "_INEDG". An output from the AND circuit 78 is inputted to the inner-edge counter 79. Further on, an output from the inner-edge counter 79 is inputted to the terminal P of the comparator 80. On the other hand, the reference value (CNTREF67-60) is inputted to the terminal Q of the comparator 80.

An output from the comparator 80 is inputted to the continuity detector 81. This continuity detector 81 detects whether or not three pixels in same logic as a target pixel a33 continue in any one of eight directions as shown in 5*5-sized matrix data 83 where the target pixel a33 is centered. Thereby, the continuity detector 81 detects continuity of inner edge. To be specific, continuity of inner edge is detected based on the following expression.

$$!Y=(a11*a22*a33)+(a13*a23*a33)\\+(a15*a24*a33)+(a35*a34*a33)\\+(a55*a44*a33)+(a53*a43*a33)\\+(a51*a42*a33)+(a31*a32*a33)$$

It should be noted that "!", "*", and "+" indicate inversion processing, AND processing, OR processing, respectively.

The continuity detector 81 thus detects continuity of an inner edge and its detection result is considered for subsequent image processing. Thereby, there is avoided an incorrect discrimination to discriminate image noise or the like as character region. That is character region can be discriminated as so more precisely.

An output from the continuity detector 81 is inputted to the AND circuits 82 and 84. Further on, an output from the comparator 77 is inputted to the AND circuit 82. A halftone solid region signal (_BETA) is inputted to the AND circuit 84. Accordingly, a logical product of an output from the continuity detector 81 and that of the comparator 77 is outputted form the AND circuit 82. This output is equivalent to a character-region against halftone-dot-region signal (_AMI_MOJI). Furthermore, a logical product of an output from the continuity detector 81 and a halftone solid region signal (_BETA) is outputted from the AND circuit 84. This output is equivalent to a character-region against halftone solid-region signal (_BETA_MOJI).

In case all of the following three conditions are satisfied in the character-region against halftone dot/halftone solid region signal generator 33, a target pixel is discriminated as belonging to character region against halftone-dot region. The three conditions to be satisfied are:

(1) Total number of isolate points is smaller than the reference value (CNTREF57-50);
(2) Total number of inner edges is larger than the reference value (CNTREF67-60); and
(3) Continuity of an inner edge is discriminated.

In case a target pixel is discriminated as belonging to character region against halftone-dot region, the character-region against halftone dot/halftone solid region signal generator 33 sets a character-region against halftone-dot-region signal (_AMI_MOJI) active.

In case all of the following three conditions are satisfied in the character-region against halftone dot/halftone solid region signal generator 33, a target pixel is discriminated as belonging to character-region against halftone solid region. The three conditions to be satisfied are:

(1) A halftone solid region signal (_BETA) is active;
(2) Total number of inner edges is larger than the reference value (CNTREF67-60); and
(3) Continuity of an inner edge is discriminated. In case a target pixel is discriminated as belonging to character region against halftone solid region, the character-region against halftone dot/halftone solid region signal generator 33 sets a character-region against halftone solid-region signal (_BETA_MOJI) active.

Let us return to FIG. 2 again. The MTF control signal generator 34 generates MTF control signals (CMPX2-0, KMPX2-0) based on color region signal (_COL_DOT), halftone-dot region signal (_AMI), character-region against halftone-dot-region signal (_AMI_MOJI), character-region against halftone solid-region signal (_BETA_MOJI), character-region-discrimination inner edge signal (_INEDG), character-edge region signal (_EDG), and black region signal (_BLACK). MTF control signals control operation of the MTF corrector 21. The MTF control signal generator 34 is constituted by look-up tables, wherein seven kinds of region-discriminating attribute signals (_COL_DOT, _AMI, _AMI_MOJI, _BETA_MOJI, _INEDG, _EDG, _BLACK) are used as input address to generate MTF signals (CMPX, KMPX).

Figure 15:
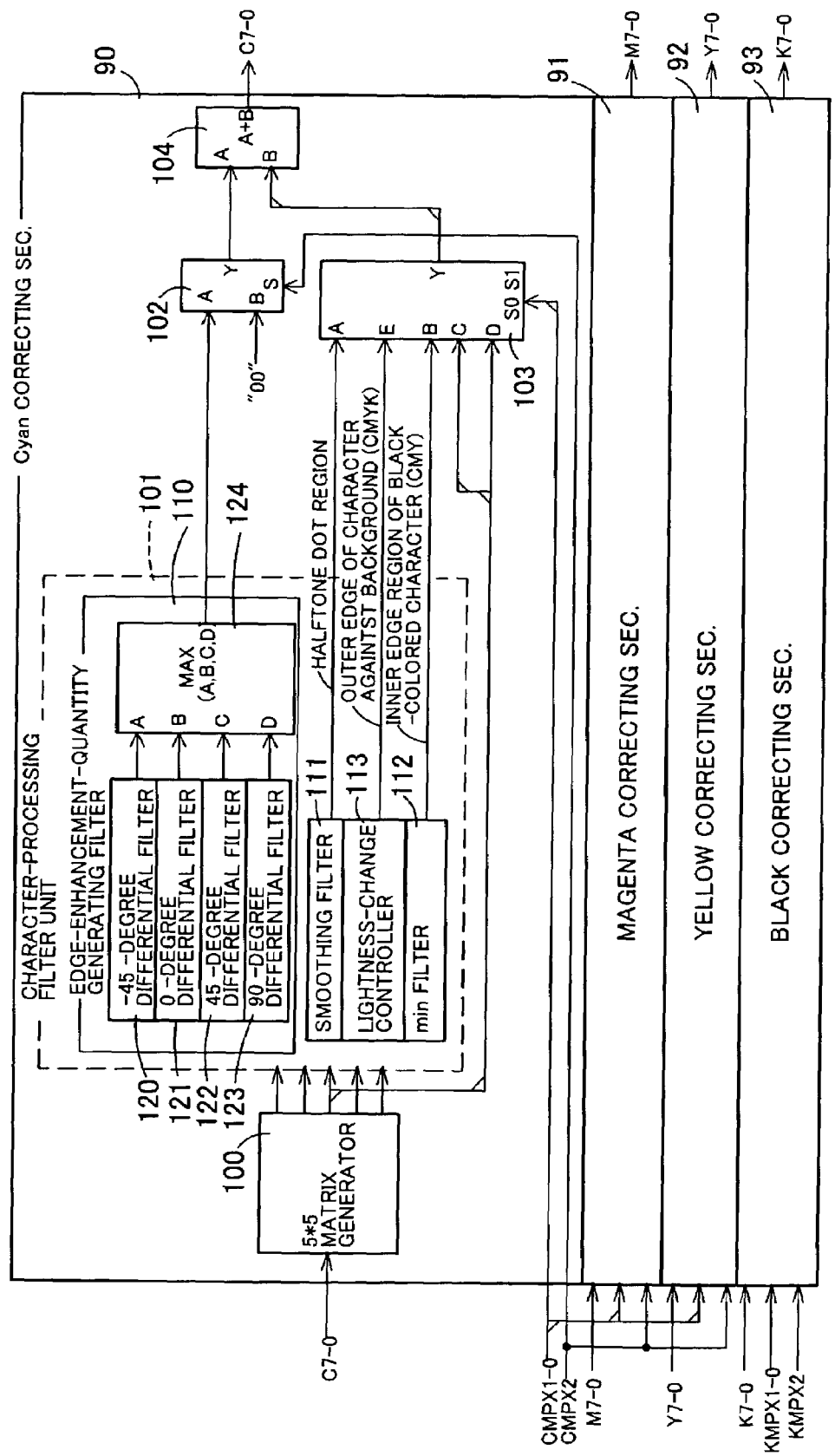
FIG. 15 is a block chart showing schematic structure of an MTF correction section of FIG. 1.

Let us return to FIG. 1. The MTF corrector 21 corrects sharpness of an image or the like. As shown in FIG. 15, the MTF corrector 21 includes a cyan (C) correcting section 90, a magenta (M) correcting section 91, a yellow (Y) correcting section 92, and a black (K) correcting section 93, corresponding to respective colors CMYK. That is, the MTF corrector 21 conducts correction processing with respect to each color. It should be noted that an MTF control signal (CMPX2-0) generated at the region discriminator 20 controls correction processing for colors CMY, whereas an MTF control signal (KMPX2-0) controls correction processing for color K.

Details of structure with respect to the correcting sections provided for the respective colors CMYK will be described. It should be noted that the cyan (C) correcting section 90, the magenta (M) correcting section 91, the yellow (Y) correcting section 92, and the black (K) correcting section 93 have identical structure. Accordingly, as a representative of those, structure of the cyan (C) correcting section 90 will be described and descriptions of the other correcting section will be omitted. As shown in FIG. 15, the cyan (C) correcting section 90 includes a matrix generator 100, character-processing filter unit 101 provided with various filters, two selectors 102, 103, and an adder 104.

The matrix generator 100 generates a 5*5 matrix and supplies 5*5-matix data to the character-processing filter unit 101. The character-processing filter unit 101 includes an edge-enhancement-quantity generating filter 110, a smoothing filter 11, a minimizing filter 112, and a lightness-change controller 113. The character-processing filter unit 101 structured as such outputs edge-enhancement-quantity data, smoothing-processing data, andminimizing-processing data.

The edge-enhancement-quantity generating filter 110 is constituted by a $-45$-degree differential filter 120, a 0-degree differential filter 121, a 45-degree differential filter 122 and 90-degree differential filter 123, and a selector 124. The selector 124 selects the largest valued data among four kinds of data obtained through processing by the filters 120 through 123. In the present embodiment, the $-45$-degree differential filter 120 has a filter shown in FIG. 16. The 0-degree differential filter 121 has a filter shown in FIG. 17, the 45-degree differential filter 122 has a filter shown in FIG. 18, and the 90-degree differential filter 123 has a filter shown in FIG. 19.

Furthermore, the smoothing filter 111 has a filter shown in FIG. 20, whereby smoothing processing is conducted. Still further, in the minimizing filter 112, a minimum value among a 5*5-matrix is selected as data for a target value, as shown in FIG. 21.

Figure 22:
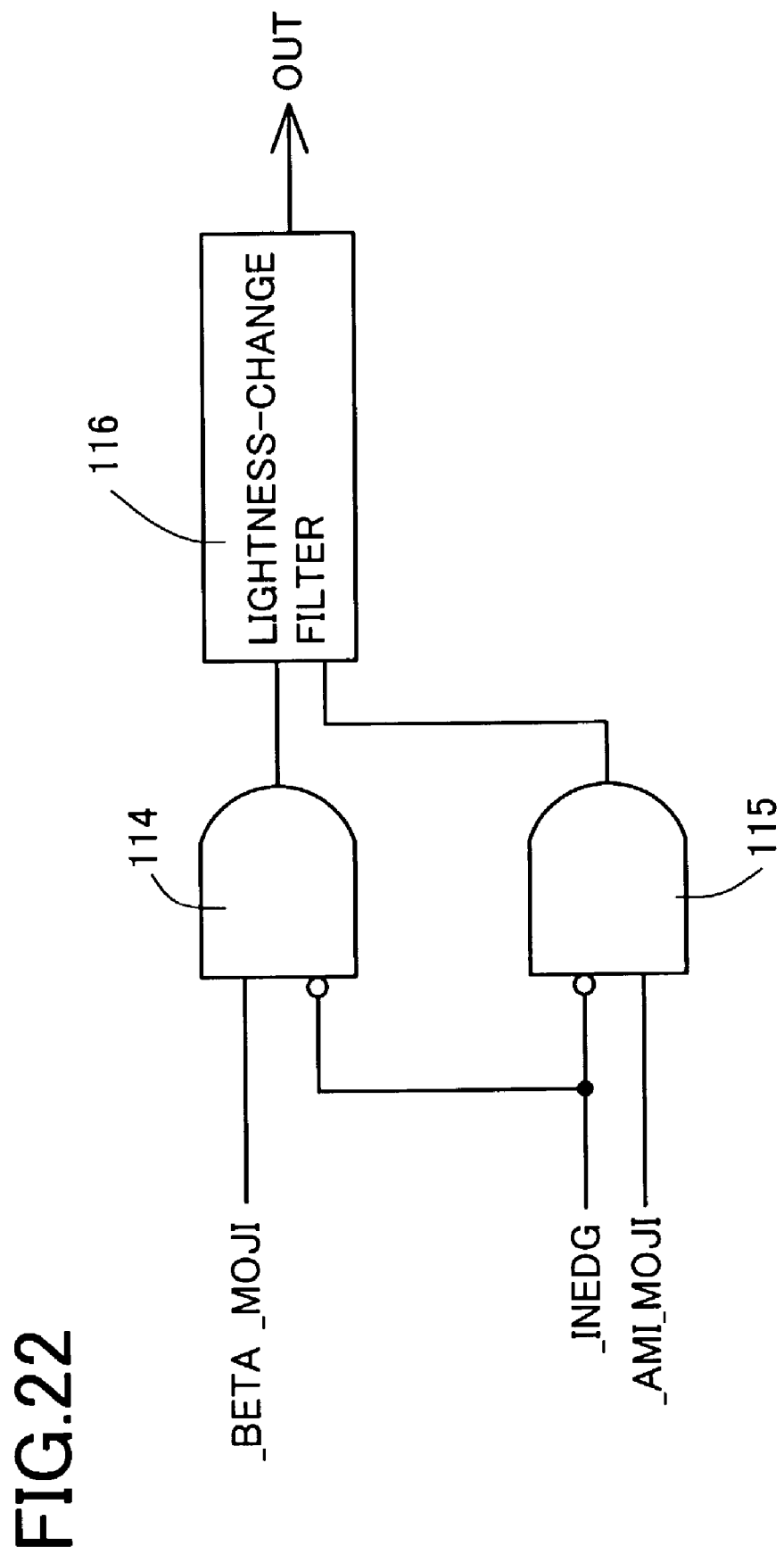
FIG. 22 is a block diagram showing a replacement control section of FIG. 15.

The lightness-change controller 113 includes two AND circuit 114, 115, and a lightness-change filter 116, as shown in FIG. 22. In the AND circuit 114, there are inputted a character-region against halftone solid-region signal (_BETA_MOJI) and an inversed signal of a character-region-discrimination inner edge signal (_INEDG) thereby to detect an outer edge region with respect to a character region against a halftone solid region. On the other hand, in the AND circuit 115, there are inputted a character-region against halftone-dot-region signal (_AMI_MOJI) and an inversed signal of a character-region-discrimination inner edge signal (_INEDG) thereby to detect an outer edge region with respect to a character region against a halftone dot region. Output signals from the AND circuits 114 and 115 are inputted to the lightness-change filter 116 in which lightness-change processing is conducted.

Figure 23:
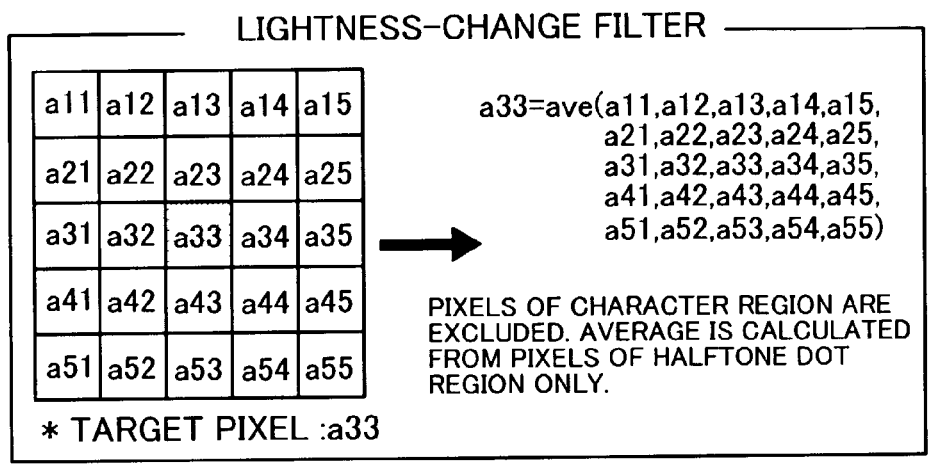
FIG. 23 shows a replacing filter.

The lightness-change filter 116 includes a filter shown in FIG. 23. This filter calculates an average value of lightness with respect to pixels in a 5*5-matrix region where a target pixel a33 is centered, and change lightness of the target pixel to the average lightness from inherent lightness. Accordingly, The lightness-change filter 116 changes lightness of an outer edge region of a character region against either a halftone dot region or a halftone solid region (in general term, referred as character region against background).

Figure 24:
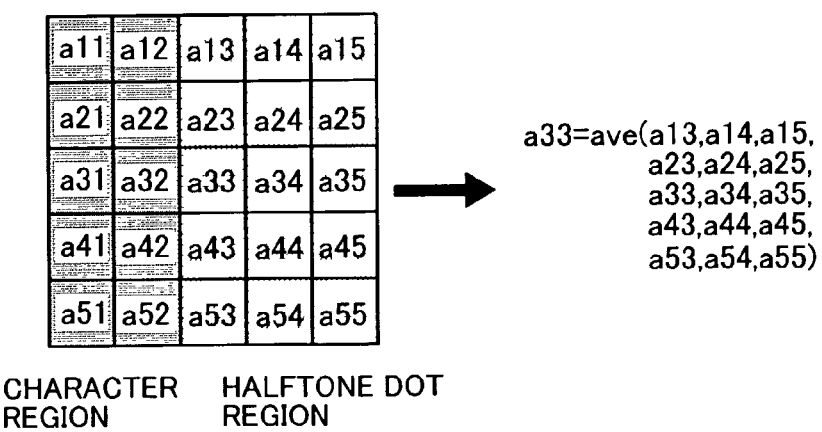
FIG. 24 is diagram for illustrating a processing method by the replacing filter.

In case a character region is included in a 5*5-matrix, the lightness-change filter 116 calculates an average value of lightness with respect to pixels belonging to a halftone dot region or a halftone solid region, i.e., other than pixels of the character region. This is because lightness data to be changed should approximate lightness of background region around the character region. Let us take a case that pixels a11, a12, a21, a22, a31, a32, a41, a42, a51, and a52 belong to a character region, as shown in FIG. 24. In this case, lightness of the target pixel a33 is changed from its inherent lightness to average lightness of pixels a13, a14, a15, a23, a24, a25, a33, a34, a35, a43, a44, a45, a53, a54, and a55.

Let us return to FIG. 15. An output from the edge-enhancement-quantity generating filter 110 is inputted to a terminal A of the selector 102. Furthermore, with respect to the selector 102, a signal "00" and an MTF control signal (CMPX2) are inputted to a terminal B and a terminal S, respectively. Thereby, the selector 102 selectively outputs either an input value of the terminal A or that of the terminal B depending on content of an MTF signal (CMPX2).

With respect to the selector 103, an output from the smoothing filter 111, an output from the minimizing filter 112, and an output from the lightness-change controller 113 are inputted to a terminal A, a terminal B, and a terminal E, respectively. Furthermore, an output from the matrix generator 100 is inputted to terminals C and D of the selector 103. What is inputted to the terminals C and D is data to which processing by the character-processing filter unit 101 is not applied. An MTF control signal (CMPX1-0) is inputted to a terminal S of the selector 103. Thereby, the selector 103 selectively outputs one of the input values of A through E depending on content of an MTF signal (CMPX1-0).

An output from the selector 102 and an output from the selector 103 are inputted to a terminal A and a terminal B of the adder 104, respectively. Thereby, the adder 104 conducts addition processing to edge enhancement data ("00" is applied in case edge enhancement is not conducted) and processing data selected by the selector 103. The resultant addition data corresponds to an output (C7-0) from the MTF corrector 21. A same manner of processing for cyan (C) is conducted to recoding density signals (M, Y, K) of other colors.

Image data of respective colors (C7-0, M7-0, Y7-0, K7-0), obtained through processing at the MTF corrector 21 are transmitted to an image output device such as a printer via a printer interface 22. Consequently, an image output device outputs to reproduce an image based on processed image data.

Next, entire operation of a color image processing apparatus having as-mentioned structure will be briefly described. Firstly, the CCD sensor 11 reads image information of a document. Analog image data outputted from the CCD sensor 11 is converted into digital image data. Then, to the converted digital image data, there are applied shading correction, between-line correction, chromatic aberration correction, variable power/migration processing, color conversion processing, color correction, region discrimination, and MTF correction subsequently. Based on resultant image data obtained through the above sequential various processing, a reproduced image of the original document is outputted onto a recording medium from a printer or the like via the printer interface 22.

The region discriminator 20 discriminates which type of region a target pixel belongs to. Types of regions are color region, monochrome region, halftone dot region, character region, and character region against halftone background. With respect to halftone dot region, character region, and character region against halftone background, it is discriminated whether or not those types of regions are color region. Discrimination of color-halftone dot region is made based on a discrimination result at the halftone dot/color region signal generator 32, i.e., discriminations halftone dot region or not and color region or not. In the next paragraph, discrimination method of halftone dot region will be described.

Discrimination of halftone dot region is made as follows. Firstly, the black-isolate-point counter 60 and the white-isolate-point counter 61 count the number of black-isolate points and that of white-isolate points in a 9*45 matrix, respectively. Counting of black/white-isolate points is conducted based on halftone-dot-discrimination isolate point signals (WAMI and KAMI) generated at the various signal generator 31. The adder 63 calculates an additional value of the black-isolate points and the white-isolate points. Then, the comparators 64, 65 and 66 compare the additional value, the number of black-isolate points, that of white-isolate points with reference values (CENTREF17-20, 27-20, 37-30), respectively. Comparison results obtained by the respective comparators 64, 65, and 66 are inputted to the OR circuit 68.

In case at least one of the following three conditions is satisfied in the OR circuit 68, a target pixel is discriminated as belonging to a halftone dot region. The three conditions are:

(1) Total number of black isolate points and white isolate points is larger than the reference value (CENTREF 17-10);
(2) The number of black-isolate points is larger than the reference value (CNTREF27-20); and
(3) The number of white-isolate points is larger than the reference value (CNTREF37-30).

In case the conditions (1) and (2) are satisfied, a halftone dot region signal (_AMI) is set "L(active)".

Next, discrimination method of color region will be described. A discrimination of color region is carried out as follows. Firstly, the color-pixel counter 62 counts up the number of color pixels in a 9*45 matrix. The number of that corresponds to the number of color signals (COLOR) generated by the color signal generator 30. Then, the comparator 67 compares the number of color pixels with the reference value (CETREF47-40). In case the number of color pixels is larger than the reference value (CENTREF47-40), a target pixel is discriminated as belonging to a color region, whereby a color region signal (_COL_DOT) is set "L (active)". That is, in case the halftone dot/color region signal generator 32 makes a discrimination of halftone dot region and color region to set both a halftone dot region signal (_AMI) and a color region signal (_COL_DOT) "L(active)" based on a discrimination result, the region discriminator 20 discriminates that the target pixel belongs to a color-halftone-dot region.

Next, discrimination method of character region against background will be described. A discrimination of a character region against background is made by the character-region against halftone dot/halftone solid region signal generator 33 arranged in the region discriminator 20. More specifically, a discrimination of a character region against halftone dots and a discrimination of a character region against halftone solid region are made separately.

Firstly, discrimination method of character region against halftone dots will be described. A discrimination of character region against halftone dots is made as follows. Firstly, the OR circuit 75 outputs logical add of halftone-dot-discrimination isolate point signals (WAMI, KAMI) generated by the various signal generator 31. The output from the OR circuit 75 is inputted to the isolate point counter 76. The isolate point counter 76 counts the number of white isolate points and black isolate points with in an 11*11 matrix region. The comparator 77 compares the number of white isolate points and black isolate points with the reference value (CNTREF57-50). This comparison result is inputted to the AND circuit 82.

On the other hand, in parallel with processing mentioned in the precedent paragraph, the AND circuit 78 outputs a logical product of a character-region-discrimination edge signal (_EDGL), and a character-region-discrimination inner edge signal (_INEDG). The output from the AND circuit 78 is inputted to the inner-edge counter 79. Then, the number of inner edges in a 3*3 matrix region is counted. The comparator 80 compares the number of inner edges with the reference value (CNTREF 67-60). This comparison result is inputted to the continuity detector 81. Then, the continuity detector 81 detects continuity of inner edges. The number of inner edges and data regarding presence/absence of continuity are inputted to the AND circuit 82.

In case all of the following three conditions are satisfied in the AND circuit 82 after all, target pixel is discriminated as belonging to a character region against halftone dot region. The three conditions are:

(1) The number of isolate points (WAMI+KAMI) is larger than the reference value (CENTREF57-50);
(2) The number of inner edges (_EDGL*_INEDG) is larger than the reference value (CENTREF67-60); and
(3) Inner edges have continuity.

When all of the above three conditions are satisfied, a character-region against halftone-dot-region signal (_AMI_MOJI) is set "L(active)". It should be noted that discriminations of a character region against halftone dot region are made for all pixels inputted as image data. That is, a target pixel is shifted one by one in a main-scan direction and when a target pixel reaches a terminal position of the main-scan direction, the next target pixel is shifted to one pixel in a sub-scan direction. Shifts of target pixels such that are repeated.

Next, discrimination method of character region against halftone solid region will be described. A discrimination of character region against halftone solid region is made as follows. Data regarding presence/absence of continuity outputted from the continuity detector 81, mentioned in the above, is inputted to the AND circuit 84, as well. Furthermore, a character-region against halftone solid-region signal (_BETA_MOJI) outputted from the halftone solid region signal generator 26 is also inputted to the AND circuit 84. In case a target pixel belongs to a halftone solid region and inner edges have continuity in the AND circuit 84, the target pixel is discriminated as belonging to a character region against a halftone solid region. Thereby, a character-region against halftone solid-region signal (_BETA_MOJI) is set "L(active)". It should be noted that discriminations of a character region against halftone solid region are made for all pixels inputted as image data.

Further on, image processing depending on various attributes is applied to image data at the MTF corrector 21. The image processing at the MTF corrector 21 is conducted in accordance with a region discrimination result obtained by the region discriminator 20, i.e., various region-discriminating attribute signals. More specifically, smoothing processing is applied to a background region. Furthermore, edge enhancement processing is applied an inner edge region of a character regions, and edge weakening processing is applied to an outer edge region. Thereby, occurrence of moire at a background region is suppressed and sharpness at a character region is secured.

Figure 25:
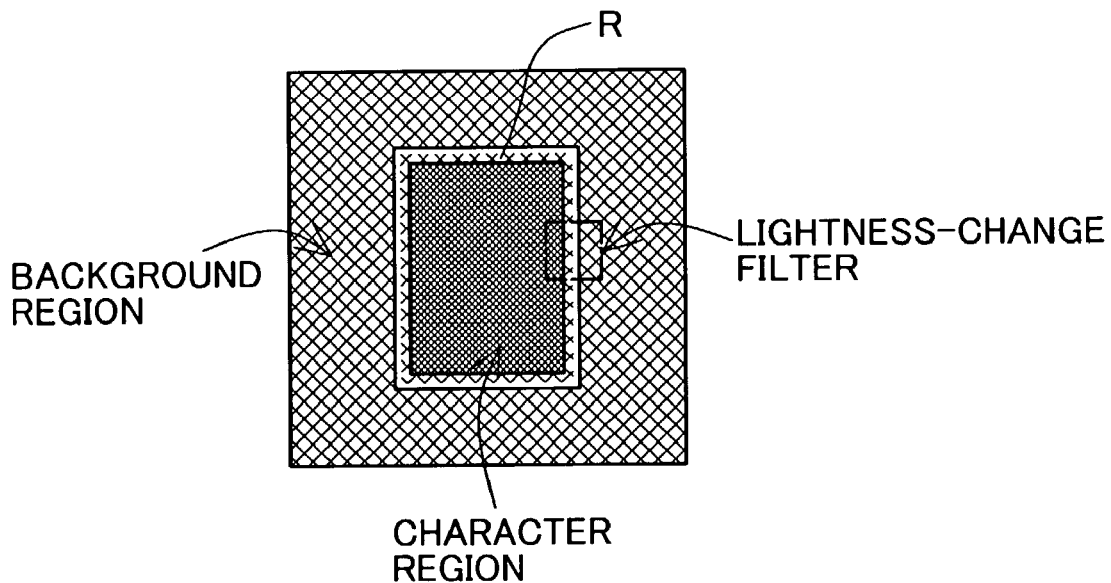
FIG. 25 is a diagram showing a specific example of an image to be processed.
Figure 26:
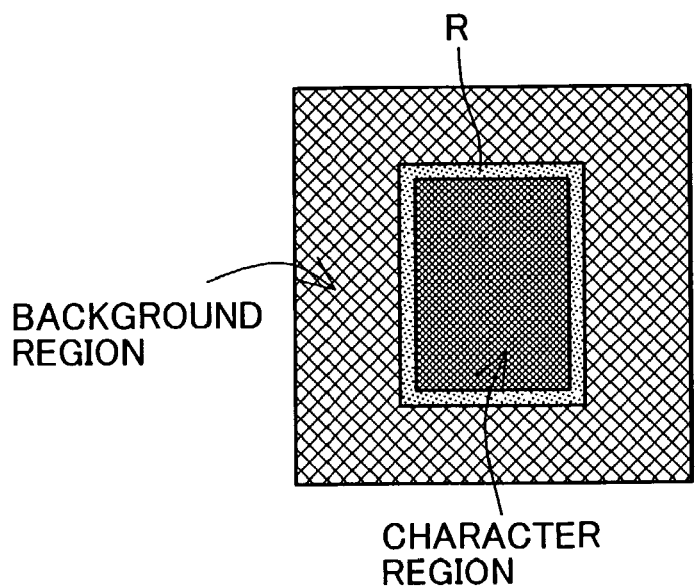
FIG. 26 is a processing result with respect to the image of FIG. 25.
Figure 27:
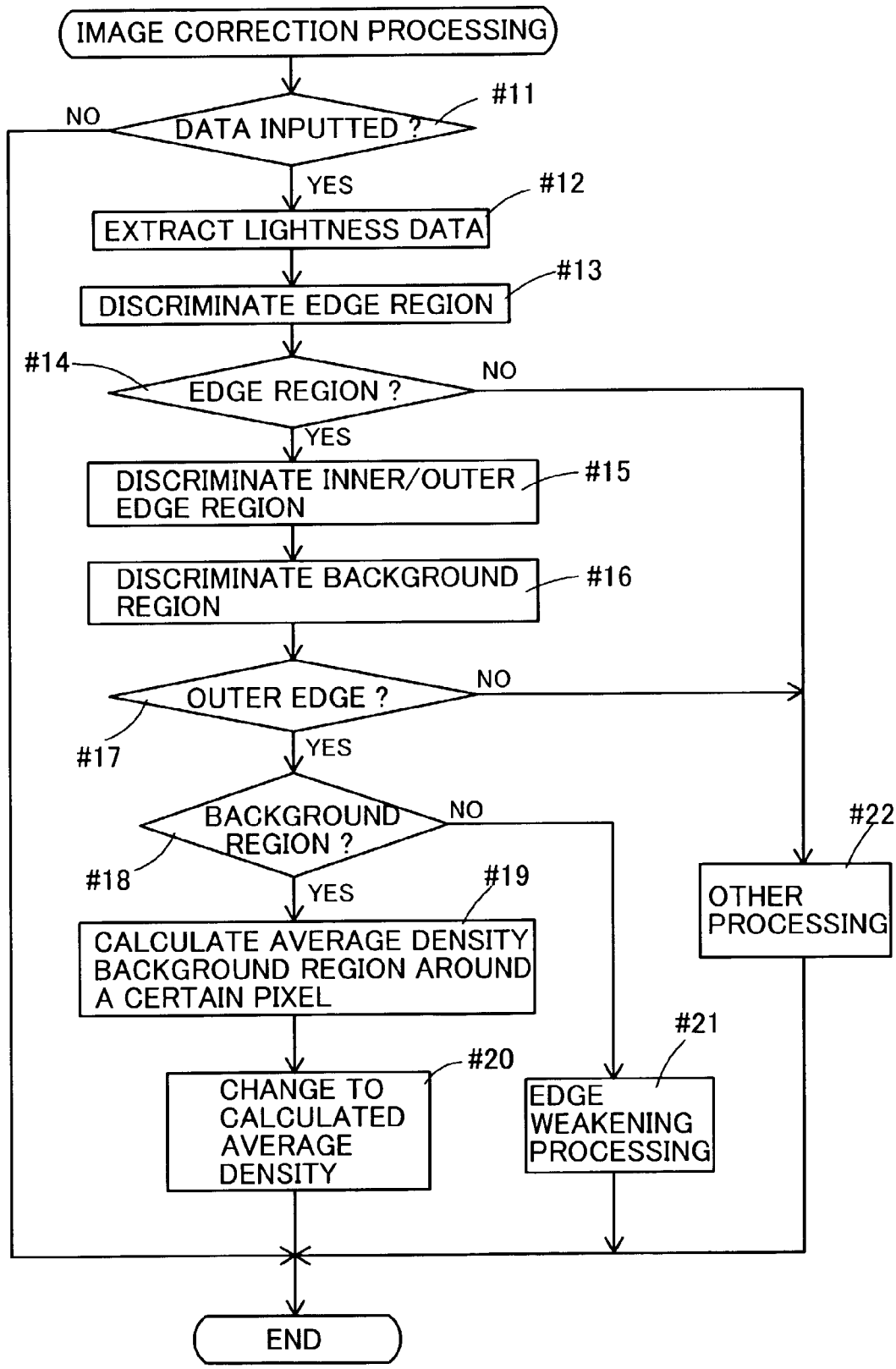
FIG. 27 shows flow chart showing processing contents to be executed in case the present invention is realized with software.
Figure 28:
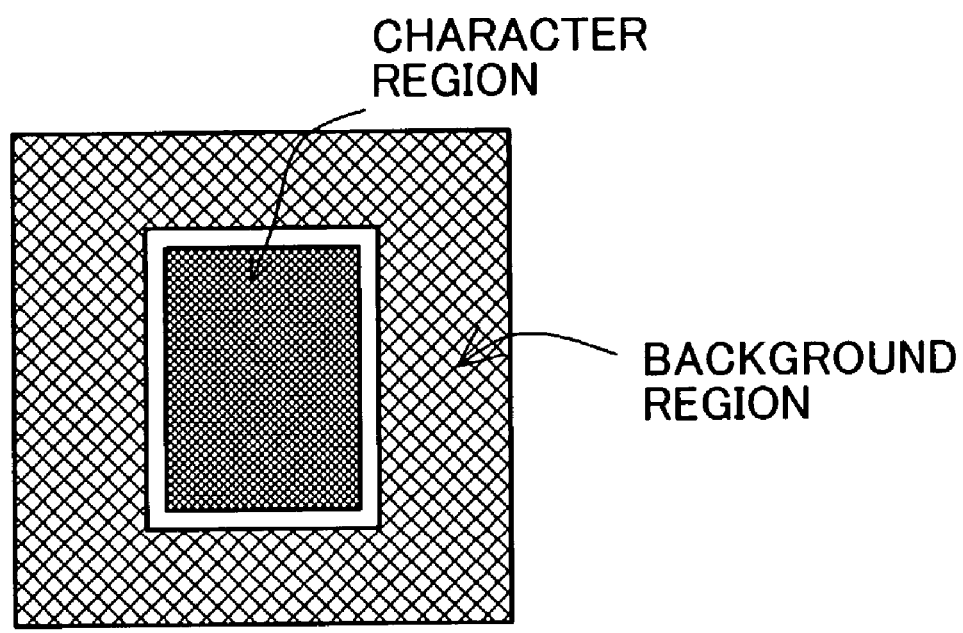
FIG. 28 is diagram for illustrating problems of conventional art.

Furthermore, edge enhancement processing is applied to an inner edge region of a character region against background region. On the other hand, lightness-change processing is applied to an outer edge region of a character region against background region by the lightness-change filter 116. For example, in case of an image as shown in FIG. 25, an outer region R of a character region is a subject of lightness change. Lightness-change processing is applied to pixels belonging to the region R by the lightness-change filter. That is, average lightness at a background region in the lightness-change filter is changed from its inherent lightness to lightness of a target pixel located in center of the lightness-change filter. Thereby, lightness of the region R becomes almost equal to that of the background region. Accordingly, a resultant image as shown in FIG. 26 can be obtained. That is, there never occurs a white-framed area around a character image against a background region (See FIG. 28.) Furthermore, since smoothing processing is not applied to the region R, there never occurs turbid of colors. That is, with the aid of the MTF corrector 21, a character image against a background region can be reproduced without a white frame around the character, turbid of colors, and deterioration of sharpness.

Descriptions so far is an example of the inventive image processing apparatus structured with hardware. However, the present invention can be embodied with software. Therefore, in the subsequent paragraphs, an example of the inventive image processing apparatus embodied by software will be described by referring to a flowchart shown in FIG.

Firstly, software of image processing is installed in a computer (controller of a copier, a printer or the like) for read. After read operation completes, the computer and the software cooperatively conduct the following processing. That is, the computer awaits an input of image data (#11). In case image data is inputted (#11:YES), the computer makes up lightness data for each pixel (#12). Making up lightness data, the computer discriminates whether or not a pixel belongs to an edge region based on the lightness data (#13). Processing of #15 is applied to a pixel discriminated as belonging to edge region (#14:YES). On the other hand, other processing (to be specific, smoothing processing) is applied to a pixel discriminated as not belonging to edge region (#14 :NO, #22)

Next, with respect to a pixel discriminated as belonging to edge region, the computer further discriminates whether such a pixel belongs to an inner edge region or an outer edge region (#15). Next, with respect to a pixel discriminated as belonging to edge region, the computer further discriminates whether or not such a pixel belongs to a background region (#16). In case a pixel discriminated as belonging to edge region is further discriminated as belonging to outer edge region (#17:YES), processing of #18 is conducted. On the other hand, in case a pixel discriminated as belonging to edge region is further discriminated as not belonging to outer edge region, in other words inner edge region (#17: NO), other processing (specifically, edge enhancement processing) is applied to the as-discriminated pixel (#22). It should be noted that "other processing" of #22 includes pluralities of processing such as smoothing processing, edge enhancement processing and the like.

With respect to a pixel discriminated as belonging to outer edge region, in case the computer further discriminates that the above said pixel also belongs to a background regions (#18:YES), average density of background region around the pixel is calculated (#19). Calculating average density, the computer changes density of the pixel from its inherent density to the calculated average density. On the other hand with respect to a pixel discriminated as belonging to outer edge region, in case the computer further discriminates that the above such pixel does not belong to a background region (#18:NO), edge weakening processing is applied to the pixel (#21).

Software to conduct image processing as above shall be read in an image processing apparatus (equivalent to a computer) without afore-mentioned hardware structure thereby to obtain effects same as the inventive image processing apparatus. That is, a character image against background can be clearly reproduce without occurring a white framed area around the character image and turbid of colors. It should be noted that the software may be computer program or may be a recording medium recoding the program.

As described so far, the color image processing apparatus directed to the present embodiment includes the region discriminator 20 constituted by the edge signal generator 25 for finding an edge region and discriminating whether the edge region is an inner edge region or an outer edge region, and the character-region against halftone dot/halftone solid region signal generator 33 for finding a character region against halftone dot region or a background region having predetermined density. Thereby, an inner edge region and an outer edge region of a character region against a background region can be discriminated accurately. The MTF corrector 21 includes the lightness-change controller 113 for applying lightness-change processing to an outer edge region of a character image against a background region. Thereby, a white-framed area around a character against a background region never occurs. Furthermore, since the lightness-change controller 113 applies lightness-change processing to an outer edge region of a character image without smoothing processing, turbid of color never occurs to a character against a background region.

The above described embodiment is provided for mere illustrative purpose, and the present invention is not limited thereto. Of course, various modifications or variations can occur without departing the spirit of the invention. Needless to say, specific numerical values (sizes of logic filters, for example) indicated in the embodiment are merely examples.

What is claimed is:

1. An image processing apparatus comprising:
   outer edge discriminating means for discriminating whether or not a target pixel belongs to an outer edge region, an outer side of an edge region, based on image data;
   background region discriminating means for finding a background region by discriminating whether or not a target pixel belongs to a background region based on image data;
   first correcting means for applying first correction processing to a target pixel based on image data;
   second correcting means for applying second correction processing, different from the first correction processing, to a target pixel based on image data; and
   correction-processing-type determining means for determining which type of correction processing, namely, first correction processing or second correction processing, is to be applied to a target pixel discriminated as belonging to an outer edge region by the outer edge discriminating means;
   wherein the correction-processing-type determining means determines to apply the first correction processing to a target pixel discriminated as not belonging to a background region by the background region discriminating means, and wherein the correction-processing-type determining means determines to apply the second correction processing to a target pixel discriminated as belonging to a background region by the background region discriminating means.

2. An image processing apparatus according to claim 1, wherein the first correction processing by the first correcting means is edge weakening processing.

3. An image processing apparatus according to claim 1, wherein the second correction processing by the second correcting means is density-change processing to change density of a target pixel to that of pixels surrounding the target pixel from its inherent density.

4. An image processing apparatus according to claim 3, wherein the density-change processing by the second correcting means is to change density of a target pixel from its inherent density to average density at a region that the background discriminating means has discriminated as background region.

5. An image processing apparatus according to claim 1, wherein the background discriminating means discriminates that a target pixel belongs to a background region in case the target pixel belongs to a halftone solid region or a halftone-dot region.

6. An image processing apparatus comprising:
   outer edge discriminating means for discriminating whether or not a target pixel belongs to an outer edge region, an outer side portion of an edge region, based on image data;
   background region discriminating means for finding a background region by discriminating whether or not a target pixel belongs to a background region based on image data; and
   density-change means for changing density of a target pixel from its inherent density to a density value calculated based on density of pixels surrounding the target pixel in case the outer edge discriminating means discriminates that the target pixel belongs to an outer edge region and the background region discriminating means discriminates that the target pixel belongs to a background region.

7. An image processing apparatus according to claim 6 wherein, as density value calculated based on density of pixels surrounding a target pixel, the density-change processing means uses average density at a region discriminated as background region by the background discriminating means.

8. An image processing apparatus according to claim 6, wherein the background discriminating means discriminates that a target pixel belongs to a background region in case the target pixel belongs to a halftone solid region or a halftone-dot region.

9. An image processing apparatus according to claim 6 further including edge weakening means for applying edge weakening processing to a target pixel in case the outer edge discriminating means discriminates that the target pixel belongs to an outer edge region and the background region discriminating means discriminates that the target pixel does not belong to a background region.

10. An image processing method comprising:
    an outer-edge-discrimination step to discriminate whether or not a target pixel belongs to an outer edge region, an outer side portion of an edge region, based on image data;
    a background-region-discrimination step to discriminate whether or not a target pixel belongs to a background region based on image data; and
    a density-change step to change density of a target pixel from its inherent density to a density value calculated based on density of pixels surrounding the target pixel in case the target pixel is discriminated as belonging to an outer edge region in the outer-edge-discrimination step and the target pixel is discriminated as belonging to a background region in the background-region-discrimination step.

11. An image processing method according to claim 10 wherein, as density value calculated based on density of pixels surrounding a target pixel, in the density-change step, there is used average density of a region discriminated as background region in the background-discrimination step.

12. An image processing method according to claim 10, wherein a target pixel is discriminated as belonging to a background region in the background-region-discrimination step in case the target pixel belongs to a halftone solid region or a halftone-dot region.

13. An image processing method according to claim 10 further including an edge-weakening step to apply edge weakening processing to a target pixel in case the target pixel is discriminated as belonging to an outer edge region in the outer edge-discrimination step and the target pixel is discriminated as not belonging to a background region in the background-discrimination step.

14. A computer program product used for executing image data processing by an image processing apparatus, the computer program product comprising:
    a computer readable medium; and
    a computer program stored on the computer readable medium, the computer program comprising step of:
    an outer-edge-discrimination step to discriminate whether or not a target pixel belongs to an outer edge region, an outer side portion of an edge region, based on image data;
    a background-region-discrimination step to discriminate whether or not a target pixel belongs to a background region based on image data; and
    a density-change step to change density of a target pixel from its inherent density to a density value calculated based on density of pixels surrounding the target pixel in case the target pixel is discriminated as belonging to an outer edge region in the outer-edge-discrimination step and the target pixel is discriminated as belonging to a background region in the background-region-discrimination step.

15. A computer program product used for executing image data processing according to claim 14, wherein, as density value calculated based on density of pixels surrounding a target pixel, in the density-change step, there is used average density of a region discriminated as background region in the background-discrimination step.

* * * * *